United States Patent [19]

Yuki et al.

[11] Patent Number: 4,517,645
[45] Date of Patent: May 14, 1985

[54] CONTROL DEVICE FOR LOADING AND UNLOADING MECHANISM

[75] Inventors: Katsumi Yuki, Toyota; Susumu Yoshida, Aichi; Mineo Ozeki, Ichinomiya; Yasuyuki Miyazaki, Aichi; Masaru Kawamata, Numazu, all of Japan

[73] Assignees: Kabushiki Kaisha Toyoda Jidoh Shokki Seisakusho; Kabushiki Kaisha Meidensha, both of Japan

[21] Appl. No.: 364,402

[22] Filed: Mar. 31, 1982

[30] Foreign Application Priority Data

Mar. 31, 1981 [JP] Japan ................. 56-47739
Mar. 31, 1981 [JP] Japan ................. 56-47743

[51] Int. Cl.³ .................. G06F 15/50; B66F 9/06
[52] U.S. Cl. .................. 364/424; 414/273; 414/636
[58] Field of Search ............... 364/424, 447, 559, 562; 187/29 R, 29 A, 29 B; 340/686; 414/272-275, 632-638, 674

[56] References Cited

U.S. PATENT DOCUMENTS 3,993,166  11/1976  Senour ................. 414/674
4,068,773   1/1978  Downing et al. ....... 414/636
4,168,934   9/1979  Downing et al. ....... 414/636
4,411,577  10/1983  Shearer, Jr. .......... 414/273
4,411,582  10/1983  Nakada ............... 414/636

FOREIGN PATENT DOCUMENTS 53-20263   2/1978  Japan .
54-37378  11/1979  Japan .

Primary Examiner—Gary Chin
Attorney, Agent, or Firm—Lowe, King, Price & Becker

[57] ABSTRACT

A control device for loading and unloading mechanism adapted to be incorporated in a fork lift truck comprises a sensor unit 100 including a lifting height sensor 102 and a load sensor 106, a control unit 200 comprising a control command producing circuit 240 constituted by a microcomputer 230 producing a control command on the basis of comparing calculation between the output of the sensor unit 100 and the concerned data stored in the microcomputer 230, a servomotor driving circuit 322' responsive to the control command indicative of a valve opening angle, and a hydraulic pressure driving circuit 340 for actuating a lift cylinder in accordance with the output of the servomotor driving circuit 322'. The control device is constituted so that, when the work for piling or unloading a load on a shelf is effected based on the stored lifting height data, the two positions required for piling and unloading can be stored in the same address allotted to the corresponding shelf can be stored. The control device is constituted so that, when lifting height data is stored in the microcomputer, an indication for confirming data storage is added to the stored lifting height data, thereby enabling to prevent an automatic lifting height control from being erroneously effected.

12 Claims, 30 Drawing Figures

FIG. 20A  SENSOR PULSE TRAIN

FIG. 20B  TIMER PULSE TRAIN

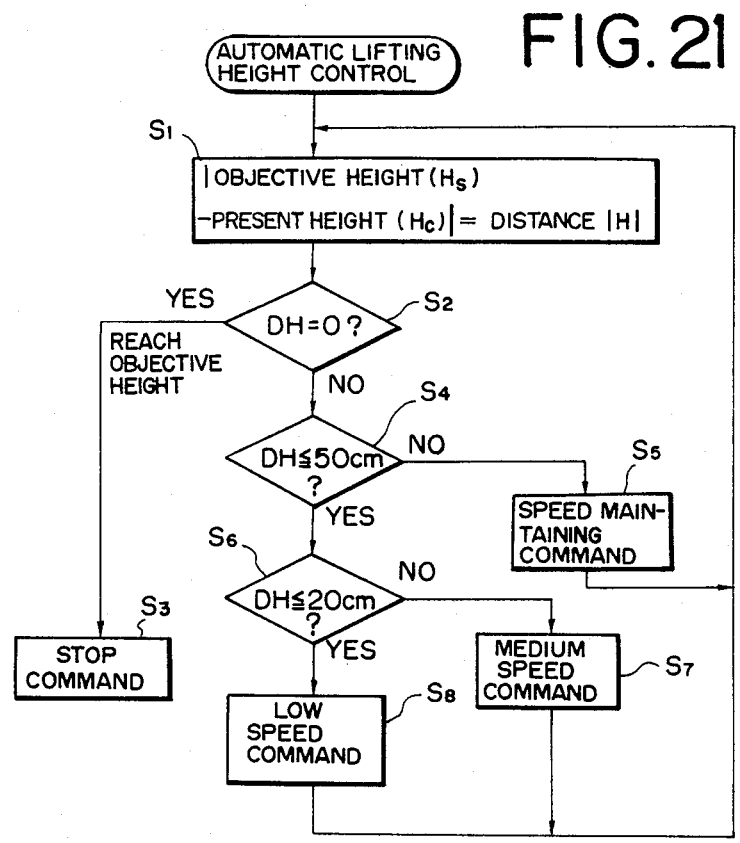

CONTROL DEVICE FOR LOADING AND UNLOADING MECHANISM

BACKGROUND OF THE INVENTION

The present invention relates to a control device for a loading and unloading mechanism, and more particularly to a lift cylinder control applied to a fork lift truck. Specifically, the present invention is concerned with a control device for a loading and unloading mechanism wherein the system control for governing the operation of a lift cylinder is supervised by a microcomputer.

As is well known, a fork lift truck comprises a loading and unloading mechanism and a vehicle body. The loading and unloading mechanism comprises a vertically elongated guide rail called an "upright", and a fork slidable in the upright. The mechanism further comprises a hydraulic member, as for example, hydraulic cylinder for lifting and lowering the fork and tilting the upright.

In connection with the prior art loading and unloading control, for instance, lifting height control, drawbacks are pointed out as follows: Recently, there is a tendency that the lifting height becomes high when loading and unloading work is effected with a fork lift truck. For instance, the piling and unloading may be effected at heights greater than 10 m. In such a case, it is difficult for an operator to adjust the loading and unloading mechanism so that the fork is placed at the predetermined height, looking at the top of the fork positioned above about 10 m relatively to the seat of the operator. Accordingly, it is desirable for the operator to easily effect piling and unloading the load at the predetermined position.

In order to embody this requirement in the prior art, the upright is provided with a limit switch for stopping the fork at a predetermined position. When the fork reaches the predetermined position, for instance, 8.5 m, the control device is designed so as to light a lamp provided at the operator's unit or break a driving power supply for loading and unloading operations. Usually, a load is unloaded on a shelf with a plurality of steps. For this reason, in order to determine the desired position it is required to select the step. The provision of a predetermined number of limit switches, for instance ten, is required in order to meet the height of the shelf. Further, it happens that the piling and unloading is required at another shelf according to the change of the working place. In such a case, if the height of the shelf is different from that of the prior one, a more complicated control device is required. Actually, it has been impossible to effect the piling and unloading operation. Further, from the point of view of the system control in the prior art, a plurality of analog control circuits, such as, comprising combination of relay circuits respectively provided with respect to the controlled system, as for example, lifting height control are incorporated in the control unit of the control device for loading and unloading mechanism. Prior to the lifting work, an operator effects various settings according to the lifting height condition required for loading and unloading operation and then starts a lifting height work. In this instance, an automatic control system is constituted, which includes therein a valve opening control system provided with respect to a hydraulic pressure circuit for actuating a lift cylinder. The lifting height control is effected so as to control the valve opening control system due to the deviation between an actual lifting height above said setting value. However, when the setting is changed to a great extent according to the change of the loading and unloading working place, it is required to adjust the automatic control system in order to stabilize the control system. Alternately, it happens that the desired control accuracy cannot be obtained. Further, such a lifting height control is effected in a series of sequential control for loading and unloading work with the lifting height control being related to various kinds of controls. Accordingly, it is desirable to supervise the whole system control in view of the simplicity of the circuit and harmonious execution of the control.

In view of this, another attempt has been made. The programmed series of sequential control matching with the objective loading and unloading operation is stored in a computer, such as a microcomputer. When, for instance, lifting height control is effected, the concerned programmed routine for lifting height control is called from the program to effect a lifting height control due to the execution of the programmed routine.

In the prior art, when a load is piled or unloaded on a shelf with a fork lift truck into which a computer controlled device is incorporated, drawbacks are pointed as follows: The method of piling a load on a shelf comprises the steps of moving an unloaded fork lift truck near the shelf, lifting the unloaded fork to the predetermined shelf, running the fork lift truck at that position in the forward direction, mounting the load on the fork, lifting the fork within the same shelf by the predetermined height, running the fork lift truck at that position in the backward direction, and lowering the fork to the predetermined running position. On the other hand, the method of unloading a load from a shelf comprises the steps of moving the loaded fork lift truck near the shelf, lifting the fork to the predetermined shelf, running the fork lift truck at that position in the forward direction, lowering the loaded fork within the same shelf by the predetermined height, running the fork lift truck at that position in the backward direction, mounting the load on the shelf, and lowering the fork to the predetermined running position.

When the piling and unloading is effected with the above-mentioned fork lift truck, the desired shelf is selected by actuating an address selecting key switch corresponding to each shelf position provided on an operating box incorporated in the truck body. In this instance, the designation or selection of two height positions within the same shelf is required. Accordingly, the actuation of the address selection key switch is troublesome.

Further, an automatic loading and unloading control, such as, lifting height control is effected in accordance with the sequential control matching with the objective loading and unloading work. An operator actuates the address selecting key switch in order to designate the address allotted to the lifting height value. In this instance, if the address to which a desired lifting height data is assigned is erroneously designated, the automatic control is effected under the condition that the data stored in this address is selected as a lifting height objective value. This brings about a serious safety problem.

In an automatic loading and unloading control supervised by a microcomputer, in addition to the drawbacks stated above, when a lifting height control is actually effected in accordance with the sequential data in connection with a loading and unloading operation stored in the microcomputer, the following drawbacks are further pointed out: When the lifting speed of the fork is controlled by an automatic lifting height control effected due to the stored lifting height, if a command for changing speed is given, it has been difficult to effect a follow-up control because of the fact that the characteristic of the opening angle of the lift valve with respect to the lifting or lowering speed of the fork in non-linear, and that there exists a response delay inherent in the automatic control system. Furthermore, when the fork reaches the objective lifting height and then is stopped thereat, there is not provided a mechanism for slowly stopping the fork. Accordingly, the fork is stopped suddenly, which brings about a safety problem.

SUMMARY OF THE INVENTION

With the above in mind, an object of the present invention is to provide a control device for loading and unloading mechanism making it possible to improve the operation of an automatic control of a fork effected in accordance with the stored sequential data for loading and unloading work.

Another object of the invention is to provide a control device for a loading and unloading mechanism making it possible to store the two positions required for piling and unloading in the same address allotted to a corresponding shelf, when the loading and unloading operation, such as the piling or unloading a load on a shelf, is effected in accordance with, stored lifting height data.

Another object of the invention is to provide a control device for a loading and unloading mechanism wherein when lifting height data are stored, for example, the indication for confirming data storage is entered into a vacant bit or bits other than bits used for storing lifting height data, or into a memory area allotted to an address related to the above-mentioned address thereby making it possible to prevent an automatic lifting height control from being erroneously effected.

Another object of the invention is to provide a control device for a loading and unloading mechanism capable of effecting a harmonious follow-up control of a fork to the objective value at the time of an automatic lifting height control.

Another object of the invention is to provide a control device for a loading and unloading mechanism making it possible to gradually approach the objective value due to a response delay of an automatic control system or a lifting height speed control when an automatic lifting height control is effected, thereby enabling to slowly and securely stop a fork at the objective value.

Another object of the present invention is to provide a control device for a loading and unloading mechanism wherein there is provided a slow stopping means in a command producing circuit, e.g. microcomputer, thereby enabling to slowly stop a fork at the objective value to improve safety.

Another object of the invention is to provide a control device for a loading and unloading mechanism making it possible to sample lifting height data within a predetermined range when lifting height data is stored in a command producing circuit, e.g. microcomputer, thereby enabling the control device to effect a harmonious automatic lifting height control.

Another object of the invention is to provide a control device for a loading and unloading mechanism wherein a command indicative of a valve opening angle for actuating a lift cylinder which lifts and lowers a fork is limited to a predetermined range, thereby stabilizing a lifting height speed when an automatic lifting height control is effected.

According to the present invention, there is provided a control device for a loading and unloading mechanism adapted to be incorporated in a fork lift truck comprising: a sensor unit, a control unit responsive to the output signal of the sensor unit, the control unit effecting a calculation on the basis of the output signal therefrom and producing a predetermined control signal according to the calculated value, a servomotor driving circuit responsive to the output signal of the control unit, and a hydraulic pressure driving circuit for lifting and lowering a fork responsive to the predetermined control signal of the servomotor driving circuit, the hydraulic pressure driving circuit producing a driving output signal for adjusting the valve opening angle for actuating a lift cylinder, characterized in that the control unit comprises an interface circuit for inputting the output signal from the sensor unit, and a control command producing circuit comprising a memory for storing a predetermined lifting height data and a data setting means for setting a data to the memory, and in that the control command producing circuit produces a control command on the basis of comparing calculation between the output of the sensor unit and the concerned data stored in the memory to effect a desired lifting height control in accordance with the control command.

BRIEF DESCRIPTION OF THE DRAWINGS

The feature and advantages of a control device for loading and unloading mechanism according to the present invention will become more apparent from the description taken in conjunction with the accompanying drawings, in which:

FIGS. 20A and 20B are waveforms illustrating a sensor pulse train and a timer pulse train, respectively, which are used at a step four of the FIG. 19 flow chart;

FIG. 21 is a flow chart illustrating a main program for automatic lifting height control employed in a sixth embodiment according to the present invention;

DETAILED DESCRIPTION OF THE PREFERRED EMBODIMENTS

Figure 1:
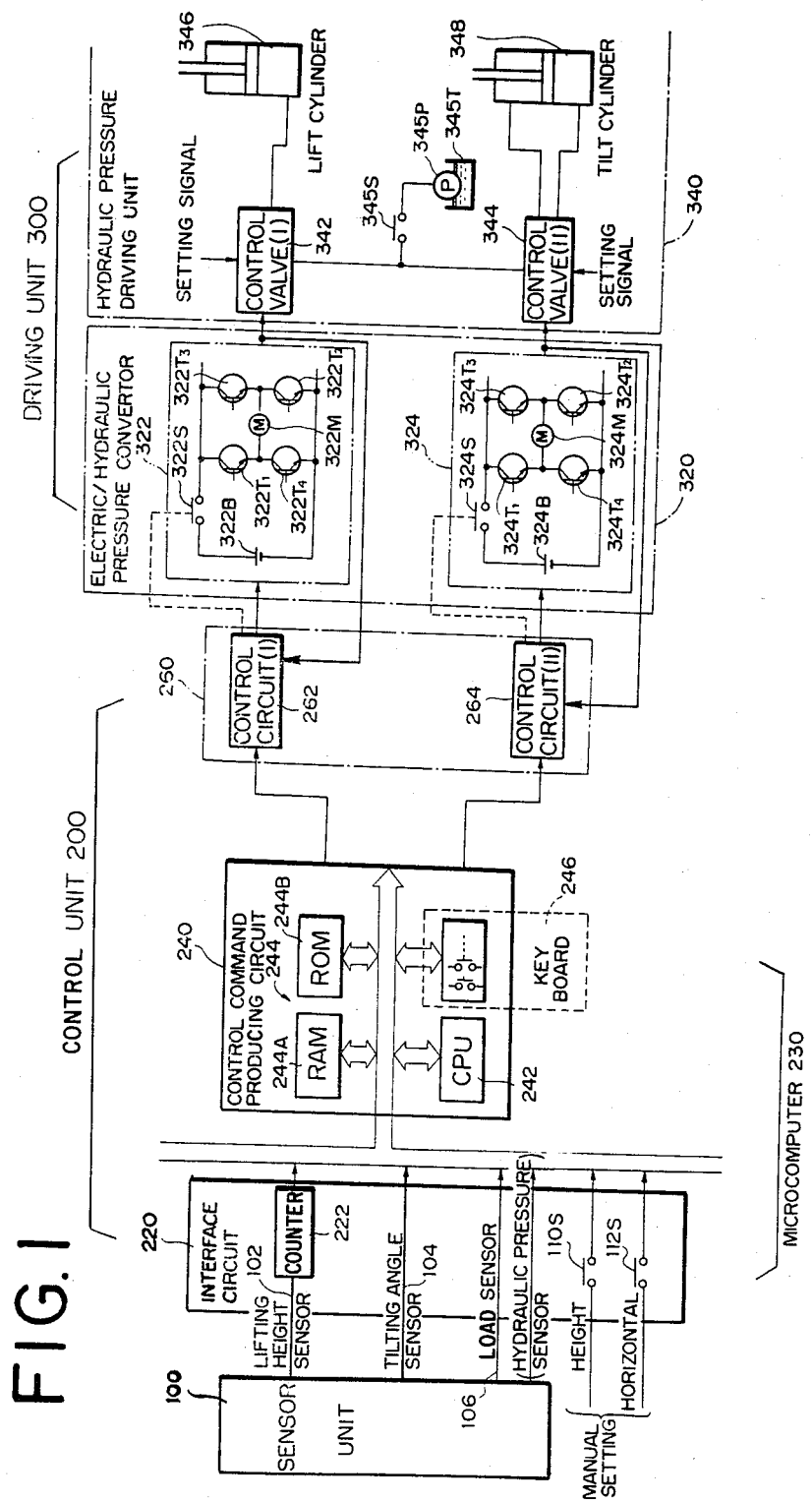
FIG. 1 is a block diagram schematically illustrating a system construction of a control device for a loading and unloading mechanism according to the present invention.

FIG. 1 is a block diagram illustrating a system construction of a control device for loading and unloading mechanism according to the present invention.

Reference numeral 100 denotes a sensor unit including a lifting height sensor 102, a tilting angle sensor 104, and a load sensor 106 (hydraulic pressure sensor). Reference numeral 200 denotes a control unit comprises an interface circuit 220 including a lifting height counter 222, a control command producing circuit 240 constituted by a microcomputer 230 responsive to the output of the sensor unit 100 fed through the interface circuit 220, and a control circuit 260 responsive to the control command being output from the control command producing circuit 240. Reference numerals 110S and 112S denote contacts for manual setting, which are closed by external commands indicative of lifting height and the horizontal position of the fork, respectively.

More particularly, the control command producing circuit 240 comprises a central processing unit (CPU) designated by reference numeral 242, a memory 244 essentially consisting of a random access memory (RAM) designated by reference numeral 244A, a read only memory (ROM) designated by reference numeral 244B in which predetermined lifting height, tilting angle, load, or other data are stored, and a data setting means 246, as for example, comprising a key board for setting desired data by an operator. The control command producing unit 240 produces a control command based on the output of the sensor unit 100 and the data in connection with lifting height, tilting angle, or load stored in the memory 244. The control circuit 260 comprises a first control circuit 262 for lifting height control system and a second control circuit 264 for tilting angle control system.

Reference numeral 300 denotes a driving unit comprising an electric/hydraulic pressure converter 320 and a hydraulic pressure driving unit 340. The electric/hydraulic pressure convertor 320 comprises a first and a second actuators 322 and 324 responsive to the output of the first and second control circuits 262 and 264, respectively. The first actuator 322 comprises a servomotor driving circuit (referred to later) essentially consisting of switching transistors $322T_1$ to $322T_4$ constituting an inverter for controlling a driving motor 322M, and a contact 322S for connecting a DC power supply 322B to the inverter on the basis of the command fed from the first control circuit 262, and a link mechanism (not shown) for joining the output shaft (not shown) of the driving motor 322M to a lift valve member referred to soon. Likewise, the second actuator 324 comprises a servomotor driving circuit (referred to later) essentially consisting of switching transistors $324T_1$ to $324T_4$ constituting an inverter for controlling a driving motor 324M, and a contact 324S for connecting a DC power supply 324B to the inverter on the basis of the command fed from the second control circuit 264, and a link mechanism (not shown) for joining the output shaft (not shown) of the driving motor 324M to a tilt valve member referred to soon. The hydraulic pressure driving unit 340 comprises a first and a second control valves responsive to the first and the second actuators 322 and 324, respectively. The first control valve 342 is connected to a lift cylinder 346 for controlling a lifting height, while the second control valve 344 is connected to a tilting cylinder 348 for controlling a tilting angle. Between the first and second control valves 342 and 344, there is provided a hydraulic pump 345P for supplying a suitable hydraulic oil thereto. Reference numeral 345T denotes a hydraulic oil tank. Reference numeral 345S denotes a contact provided in an electromagnetic valve (not shown) for feeding and interrupting a hydraulic oil fed from the hydraulic pump 345P in accordance with an external command. The abovementioned first control circuit 262, the first actuator 322, first control valve 342, and a lift cylinder 346 constitute a servo control circuit for lifting height control system. Likewise, the above-mentioned second control circuit 264, the second actuator 324, and the second control valve 344, and a tilt cylinder 348 constitute a servo control circuit for tilting angle control system.

Figure 2:
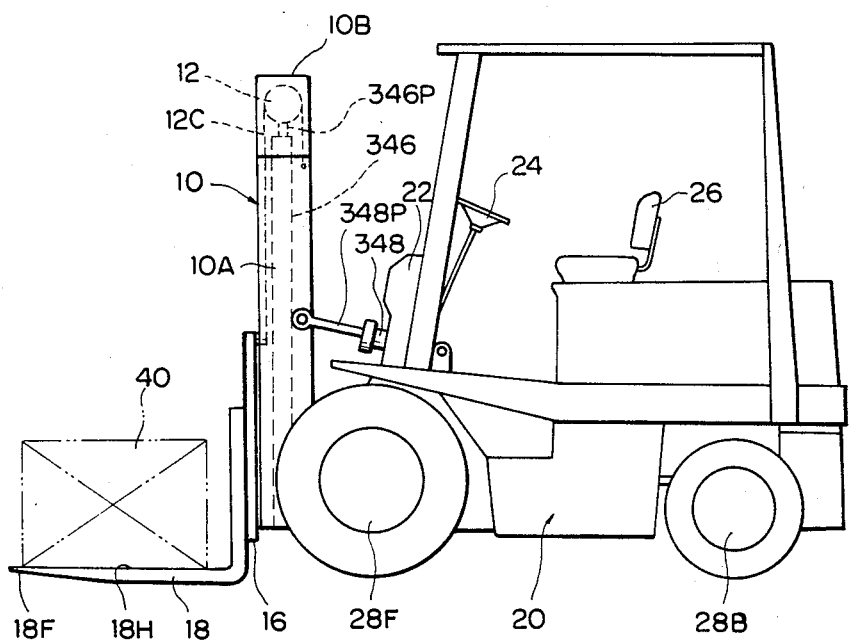
FIG. 2 is a side view illustrating a fork lift truck to which the present invention is applied.

FIG. 2 shows a fork lift truck to which the control device for loading and unloading mechanism according to the present invention is applied. Reference numeral 10 denotes a pair of uprights provided on the right and left sides, each comprising an outer mast 10A and an inner mast 10B supported by the outer mast 10A so as to move in the upper and lower directions. The lower end portion of the outer mast 10A is mounted on the front side of a truck body 20 so as to fluctuate. Reference numeral 348 denotes the above-mentioned tilt cylinder mounted to the front portion of truck body 20. A piston 348P of the tilt cylinder 348 is joined to the outer mast 10A so that the tilting angle in the forward and backward directions of the upright 10 can be adjusted. Reference numeral 346 denotes the above-mentioned lift cylinder mounted on the central portion between the pair of uprights 10A, wherein the piston 346P thereof is joined to the inner mast 10B can be adjusted through a chain wheel supporter 10S so that the height of the inner mast 10B in the upper and lower directions. Reference numeral 12 denotes a chain wheel rotatably mounted on the upper end of the piston 346P. A chain 12C is fitted over the chain wheel 12. The one end of the chain 12C is joined to the outer mast 10A or the lift cylinder 346. The other end of the chain 12C is joined to a movable member 16 slidably fitted into the inner mast 10B or a fork 18 supported by the movable member 16.

Reference numeral 18F denotes a top portion or free end of the fork 18. A load designated by reference numeral 40 is mounted on a horizontal portion 18H of the fork 18. Reference numeral 24 denotes a steering wheel for usual running control. Reference numeral 26 denotes a seat for an operator. Reference numerals 28F and 28B denote a front wheel and a rear wheel, respectively.

Figure 3:
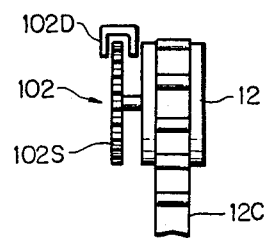
FIG. 3 is a side view illustrating a lifting height sensor incorporated in the fork lift truck shown in FIG. 2.

Accordingly, when the lift cylinder 346 becomes operative, the inner mast 10B elevates. According to this movement, the fork 18 which is attached to the chain 12C moves upwards along the inner mast 10B. As a result, a load 40 mounted on the fork 18 is lifted. FIG. 3 shows a detail of the portion with which the above-mentioned lifting height sensor 102 is associated. The lifting height sensor 102 comprises a disk 102S having a plurality of slits coaxially mounted to the chain wheel 12C and a sensor unit 102D, which may be an electromagnetic type, in the embodiment, for instance, consisting of a light source and a light detector (not shown). The slitted disk 102S rotates in accordance with the rotation of the chain wheel 12. The number of the slits passing the light source end detector is detected by the sensor unit 102D. More particularly, the sensor unit 102D produces a pulse signal corresponding to the number of the slits, thereby detecting the lifting height.

Figure 4:
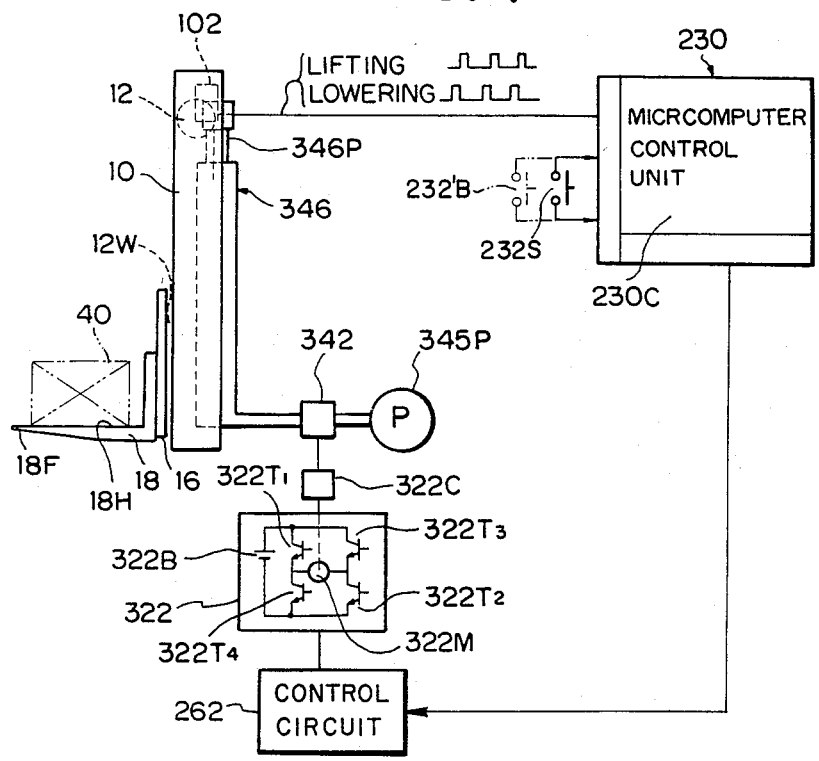
FIG. 4 is a block diagram illustrating a first embodiment of a control device for a loading and unloading mechanism according to the present invention.

FIG. 4 is a block diagram, simplified for purposes of explanation, wherein the same reference numerals shown in FIG. 1 denote corresponding constituent members. Referring to FIG. 4, reference numeral 232S denotes a push-button switch for starting an automatic lifting height. When the push-button switch 232S is switched on, the lifting height control is effected due to lifting height data stored in a microcomputer unit 230C comprising e.g. the above-mentioned control command producing circuit 240. Reference numeral 232'B referred to later denotes an address selection key switch for selecting a desired shelf position when the piling and unloading of a load is effected.

However, a loading and unloading operation is effected with a fork lift truck in which the above-mentioned control device for loading and unloading mechanism is incorporated.

Figure 5A:
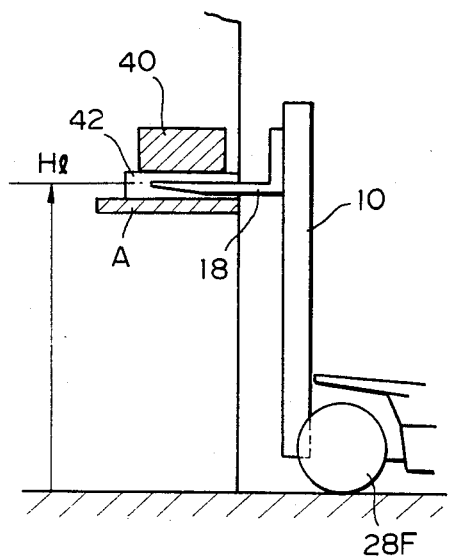
FIGS. 5A and 5B are views for explaining loading and unloading operations effected with a fork lift truck into which the control device shown in FIG. 4 is incorporated.
Figure 5B:
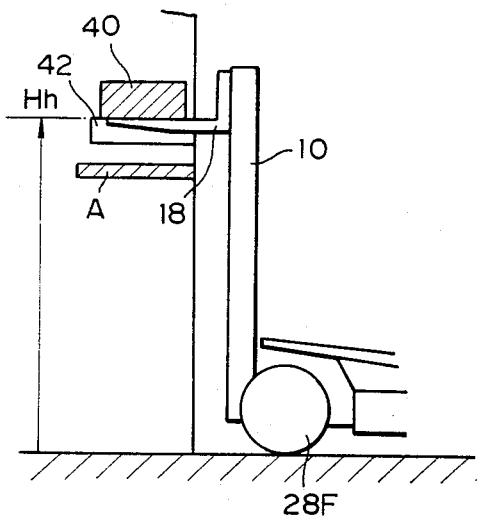

In the prior art, the storing of lifting height data is effected in the microcomputer 230 in such a manner that that independent address is assigned in connection with the height positions Hh and Hl showing the same height of the shelf labelled by A as shown in FIGS. 5A and 5B. Accordingly, two addresses are required with respect to the same shelf. For this reason, it is necessary for an operator to memorize a large number of addresses. As a result, it is likely that there will occur an error in the handling thereof. Further, when the piling of the load 40 on the shelf of FIG. 5A is required, the following drawback is pointed out.

In connection with a situation wherein the load 40 is lifted upwards to the height of Hh and the case that the load 40 is lifted downwards from the height Hh to the height Hl, it is necessary for an operator to actuate the address selection key switch 232'B for each of these occurrences because the address of Hh is different from that of Hl prior to starting of the lifting height operation. Accordingly, this operation is troublesome for an operator.

The first embodiment has solved this problem. The feature according to the first embodiment of the invention resides in that the two positions (e.g. Hl, Hh in FIGS. 5A and 5B) can be stored in the same address of the memory in the microcomputer 230. For instance, with reference to FIGS. 5A and 5B, at the height position of the fork 18 shown in FIG. 5A, the position of Hl at which the load 40 is not mounted on the fork 18 is stored in an address A shelf corresponding to a shelf A. Further, at the height position of the fork 18 shown in FIG. 5B, the position Hh, at which the load 40 is mounted on the fork 18 through the palet 42, is stored in the address A of the h-memory corresponding to the shelf A.

Figure 6:
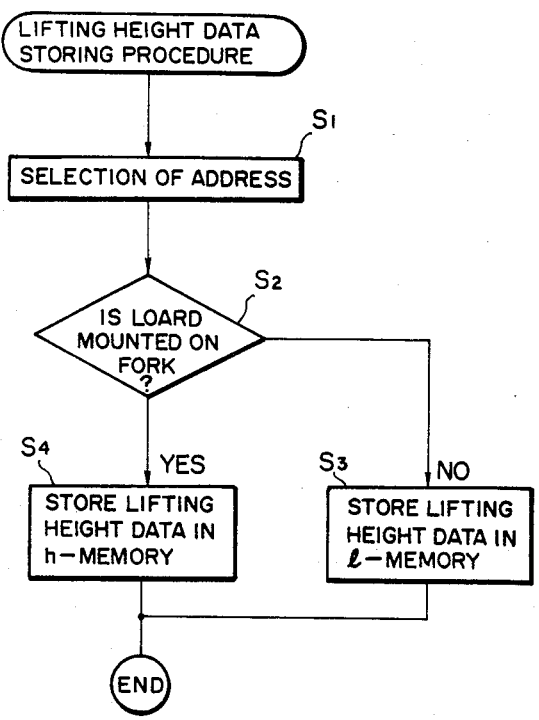
FIG. 6 is a flow chart showing a procedure for storing lifting height data employed in the first embodiment of the invention.

The memory of these lifting height positions Hl and Hh is effected in accordance with the flow chart shown in FIG. 6. For instance, in connection with the lifting height memory of Hl shown in FIG. 5A, at the step $S_1$ the address corresponding to shelf is selected as address A with the address selection key 232'B. When the A address is selected, the judgement is made at step $S_2$ as to whether the load 40 is mounted on the fork 18. As a result, it is judged that there exists no load. Accordingly, a lifting height memory key (not shown) is pressed as shown in the step $S_3$. Thus, the lifting height of Hl is stored in the l-memory. Further, in connection with lifting height memory of Hh shown in FIG. 5B, the address A corresponding to shelf A is selected at the step $S_1$. In this instance, it is judged that there exists load at the step $S_2$. Accordingly, a lifting height memory key is pressed, and the lifting height of Hh is stored in the h-memory, as shown in the step $S_4$.

In this instance, the judgment as to whether there is a load on the fork may be effected by the operator. Alternately, instead of the judgement of the operator, a limit switch responsive to the presence or absence of the load on the fork or a pressure switch responsive to inner hydraulic pressure of the lift cylinder supporting the cylinder may be used. As a result of the sensing with these switches, if the load is present, h-memory is automatically selected, while if the load is absent, l-memory is automatically selected.

Figure 7:
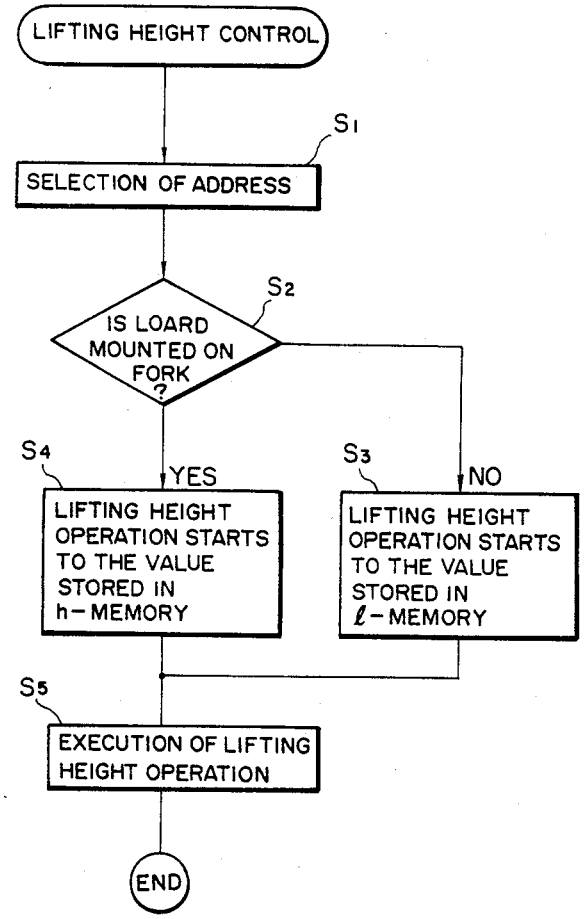
FIG. 7 is a flow chart showing a procedure for controlling the lifting height employed in the first embodiment of the invention.

The flow chart for lifting height control is shown in FIG. 7. At the step $S_1$, the selection of the address is effected. At the step $S_2$, the judgement is made as to whether there exists a load on the fork. If it is judged that there exists no load, the procedure is shifted to the step $S_3$. The lifting height operation starts so that the lifting height reaches the lifting height value Hl stored in the l-memory as shown in the step $S_5$. If it is judged that there exists a load, the control is shifted to the step $S_4$. The lifting height operation starts so that the lifting height reaches the lifting height value Hh stored in the h-memory as shown in the step $S_5$. In this instance, as the switch for starting the lifting height control, a two position switch is used. When the switch is closed on the desired side ($H_l$ or $H_h$), the control is started to the stored height positioned on the side of closing direction selected by the switch. The function designated by the steps $S_1$ to $S_4$ can be executed with the switch for starting the lifting height control. Accordingly, instead of the switch 232S for starting automatic lifting height shown in FIG. 4 the above-mentioned switch for starting lifting height control is incorporated with the microcomputer 22. The lifting height operation for storing lifting height data and the subsequent automatic lifting height operation required for loading and unloading work can be automatically effected.

If the above mentioned lifting height data storage is completed, the subsequent procedure will be effected by the following steps:

(1) When it is required to carry a load and place it on the shelf A shown in FIGS. 5A and 5B, in front of the shelf, a. The address of a shelf is selected. (with the address selection key provided on the consol panel or the key board of the microcomputer)

b. When the switch for starting the lifting height control is shifted to the switching position for storing Hh, the fork 18 moved to the height Hh.

c. The fork 18 is advanced forward so that the load 40 can be placed on the shelf A. (see FIG. 5B)

d. When the switch for starting the lifting height control is shifted to the switching position for storing Hl, the fork moves to the height Hl so that the load is placed on the shelf A. (see FIG. 5A)

(2) When it is required to pick up a load 40 from the shelf, in front of the shelf, a. The address of A shelf is selected (with the address selection key switch provided on the consol panel or the key board 246 of the microcomputer 230).

b. When the switch for starting the lifting height control is shifted to the switching position for storing Hl, the fork 18 moves to the height Hl.

c. The fork 18 is advanced so as to put it into the palet 42. (see FIG. 5A)

d. When the switch for starting the lifting height control is shifted to the switching position for storing Hh, the picking-up of the load 40 is completed. (see FIG. 5B)

As is clear, the first embodiment of the invention is capable of storing the two positions (for instance, Hl Hh) in the same address of the memory 244 of the microcomputer 230. Accordingly, one shelf can correspond to one address. As a result, in comparison with the prior art, it is easy for an operator to bear in mind the relationship between the shelf and the address. It is sufficient for an operator to bear in mind a small number of addresses, thereby making it possible to eliminate erroneous actuation of the address selection key switch. Further, the embodiment of the invention makes it unnecessary to actuate the address selection key switch for each operation as in the prior art. As a result, there is no erroneous operation, thereby enabling an increase in the working efficiency.

Reference is made to the second embodiment of the invention.

Figure 8:
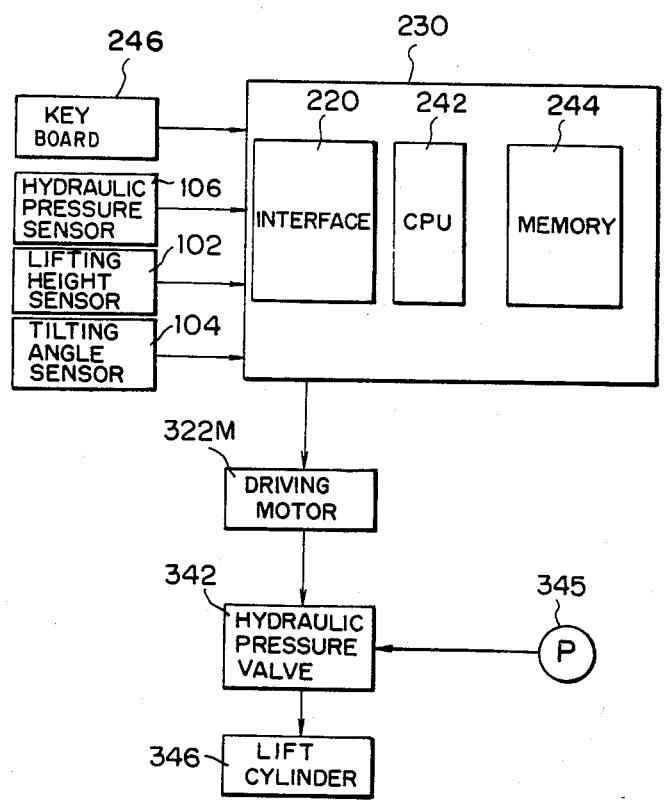
FIG. 8 is a block diagram illustrating a second embodiment of a control device for loading and unloading mechanism according to the present invention.

FIG. 8 is a block diagram showing an automatic loading and unloading mechanism constituted wherein the same reference numerals used in FIG. 1 denote corresponding parts, respectively. Reference numeral 106 denotes a hydraulic pressure sensor for sensing the hydraulic pressure of the lift cylinder 346. Since the hydraulic pressure of the lift cylinder 346 elevates in the loaded condition, the pressure sensor 106 feeds an output "1" to the microcomputer 230. On the contrary, in the unloaded condition, the pressure sensor 106 feeds an output "0" to the microcomputer 230. The pulse output of the lifting height sensor 102 is also fed to the microcomputer 230. In the microcomputer 230, the pulse input is counted by the lifting height counter 222 (see FIG. 1) provided in the interface circuit 220. At the same time, a predetermined arithmetic processing is effected based on the output of the lifting height counter 222 in the microcomputer 230 to calculate the lifting height distance. The calculated height distance is displaced on the key board 246.

In the above mentioned automatic loading and unloading mechanism, when the operator calls the specified address to which the lifting height data is stored by the actuation of the key board, and then pushes the push-button switch for starting automatic lifting height control, the microcomputer 230 produces a control command for hydraulically driving the control valve 342 through the driving motors 322M on the basis of the information obtained by the pressure sensor 106, the lifting height sensor 102 to effect an automatic lifting height control by operating the cylinder 346 so that the lifting height is equal to the data previously stored.

Assuming that, when a specified address is called in order to effect the automatic lifting height control, the operator erroneously calls an address of the memory in which the lifting height data is not stored, there occurs the following problem: Since the concerned memory erroneously called does not contain the data required for regular automatic lifting height control, if the push-button switch for starting automatic lifting height control is pushed, the lifting height operation of the fork 18 is effected based on the data having no relation with the lifting height control, with the result that there occurs a dangerous accident.

Figure 9:
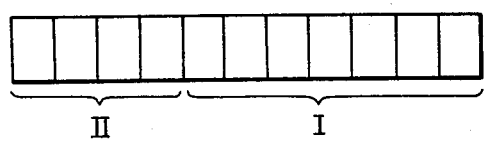
FIG. 9 is a view for explaining a condition wherein a lifting height storing indication is alloted to vacant bits in a memory area in which lifting height data is stored in accordance with the second embodiment of the invention.

In the present embodiment, when the lifting height data is stored in the address the following technique is employed. Assuming that a microcomputer has a memory area in which 16 bits of data can be stored. As shown in FIG. 9, the numeral, for instance coded signal 1010, showing that the lifting height data is stored in advance in a memory area II, designated as a vacant area, in which 4 bits of data can be stored according to need, the area excluding a memory area I comprised of 12 bits used for storing the lifting height data. When effecting an automatic lifting height control, prior to the actuation of the push-button switch for starting an automatic lifting height control, the operator determines whether the numeral indicating that the lifting height data is stored in the specified address. The operator pushes the button for starting an automatic lifting control solely upon determining the presence of the numeral.

Figure 10:
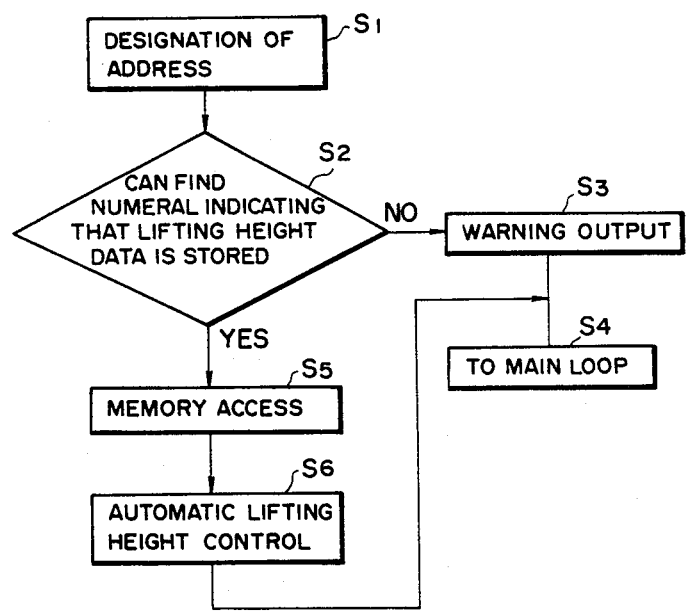
FIG. 10 is a flow chart showing that program execution is shifted to an automatic lifting height control upon the confirmation of the lifting height sorting indication.

FIG. 10 is a flow chart for effecting these procedures by program control. The method comprises the steps of designating the address (step $S_1$), examining or judging as to whether there exists a numeral showing that the lifting height data is stored in the address (step $S_2$), if the numeral is not found, producing an alarm output (step $S_3$), and returning the program execution to the main loop (step $S_4$). In this instance, since the lifting height data is not stored, the storage of the data necessary for lifting height control is required. On the other hand, if the numeral is found at the step $S_2$, as shown in the step $S_5$, the concerned stored lifting height data is read out to effect an automatic lifting control (step $S_6$), and then the program execution is returned to the main loop shown in the step $S_4$ to execute a program in connection with the other control. Accordingly, when the numeral showing the memory cannot be found, the automatic lifting height control cannot be effected, even if the push-button switch for starting the automatic lifting height control is pushed. As a result, there is little possibility that the fork moves to the position erroneously designated, thereby improving operating safety. The operator recognizes by the alarm signal that the lifting height data is not stored in the address.

In the second embodiment, a certain number (e.g., a binary coded numeral) indicating the data, is stored in the vacant area II of the memory corresponding to the same address as that of the memory area I in which the lifting height data is stored. In addition to such a storing method, the numeral indicating data is stored in the vacant bit of an address relevant to the address in which the lifting height data is stored. In this instance, it is sufficient to check as to whether the numeral indicating memory is present in the relevant address when an automatic lifting height control is effected.

Reference is made to the third embodiment of the invention.

It is necessary to move the fork 18 to the predetermined height when the lifting height data is stored in memory 244 of the microcomputer 230 with the key board 246. In this instance, if the fork 18 is lifted to the maximum height, the hydraulic pressure of the lift cylinder 346 increases even in the unloaded condition. As a result, the hydraulic pressure sensor 106 is turned on. The microcomputer 230 erroneously recognizes that it is a loaded condition. For this reason, even if an operator causes to store the lifting height data in the unloaded condition into the microcomputer 230 by the actuation of the key board 246, the data is automatically stored in the address allotted to the loaded condition. As a result, there occur inconveniences or serious errors in the automatic lifting control either in the unloaded or loaded conditions. Further, assume that the lifting height data is stored in the microcomputer 230 under the condition that the fork 18 is lowered to ground. When the thickness of the horizonal portion 18H of the fork 18 is large as compared with a conventional fork, even if attempting to lower the fork 18 to a stored position corresponding to ground by effecting an automatic lifting height control, it is actually impossible to lower the fork 18 to the stored ground position. For this reason, there is a drawback that the command indicative of lowering of the fork 18 is continuously fed from the microcomputer 230, thereby resulting in a situation in which the system is unable to shift to the subsequent operation.

Figure 11:
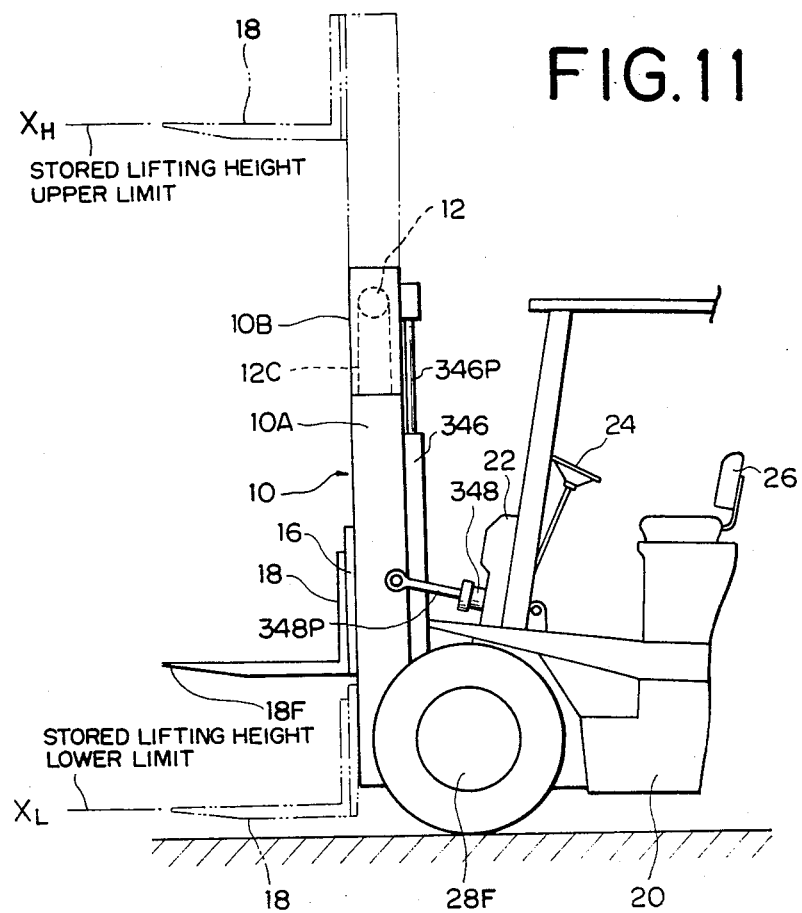
FIG. 11 is a side view for explaining a lifting height operation according to the third embodiment of the invention.

The first embodiment of the present invention has solved these problems, which will be explained with reference to FIG. 8. The upper limit and the lower limit to be stored are setted in the microcomputer 230 as shown by labels $X_H$ and $X_L$ in FIG. 11. In this instance, the upper limit to be stored is selected so that it is slightly lower than the lifting height corresponding to the output of the load sensor 106 associated with the lift cylinder 346 in the unloaded condition, while the lower limit to be stored is selected so that it is slightly larger than that of maximum value of the thickness of the horizontal portion 18H of the fork 18. The microcomputer 230 executes a program based on a flow chart shown in FIG. 12. At the tep $S_1$, the concerned memory routine is looked up in the main loop for controlling various kinds of controls required for, such operations as the lifting height control of the fork 18, stored in ROM 244B of the microcomputer 230. If the memory routine is found by looking-up, at the step of $S_2$, the concerned memory routine is called. At the step $S_3$, the comparison between the stored lower limit of the lifting height value and the present lifting data obtained from the lifting height sensor 102 is effected with the memory routine. At the step $S_4$, if the result is minus, that is, the present lifting height value is above the stored upper limit of the lifting height, the execution of the program is returned to the main loop at the step $S_1$, for a second time. On the contrary, if the result is equal to zero or plus, that is, the present lifting height value is lower than the stored upper limit of the lifting height, the execution of the program is shifted to the step $S_5$. At the step $S_5$, the comparison between the lower limit of memory previously stored and the present lifting height value is further effected. At the step $S_6$, if the result is equal to zero or is positive, that is, the present lifting height value is lower than the lower limit of the memory or equal thereto, the program execution is returned to the main loop at the step $S_1$, for a second time. On the contrary, if the result is negative, the present lifting height value is higher than the lower limit of the memory, the program execution is shifted to the step $S_7$. At the step $S_7$, the signal "memory OK" showing that it is possible to store the lifting height data is transferred to the memory subroutine. Thus, it is possible to store the predetermined lifting height value in the microcomputer 230.

Figure 12:
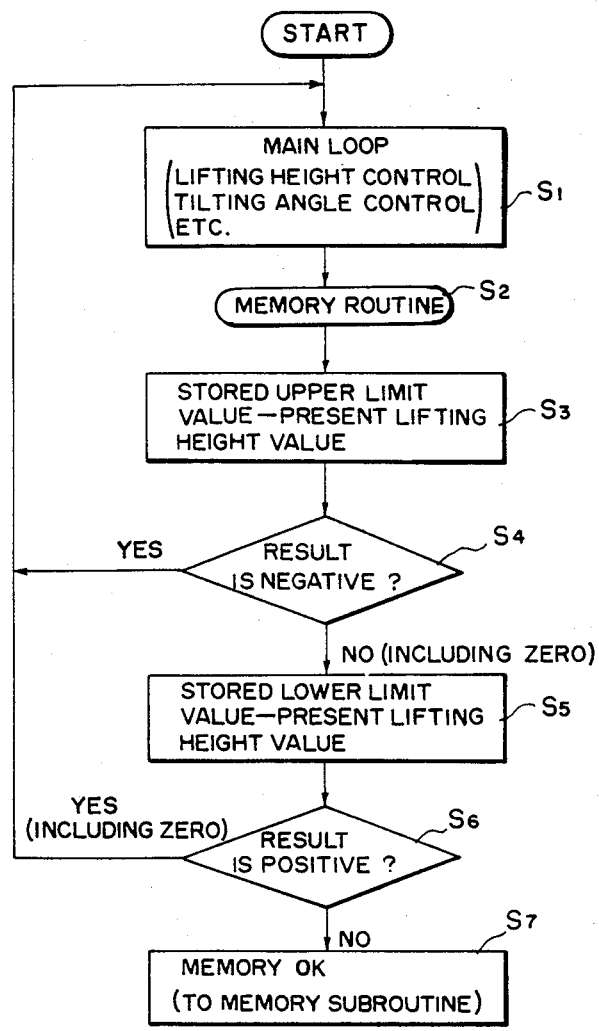
FIG. 12 is a flow chart for checking lifting height data stored in a microcomputer with respect to the stored upper and lower limits in accordance with the third embodiment of the invention.
Figure 13:
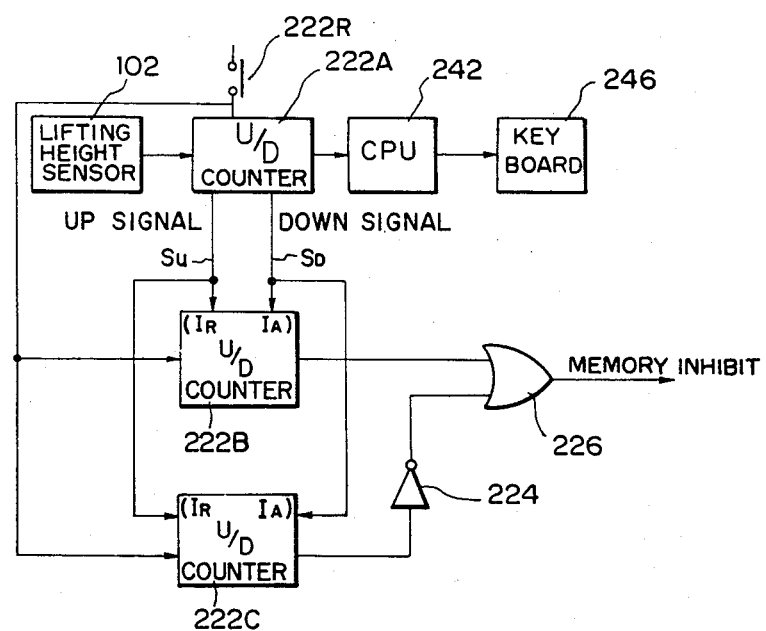
FIG. 13 is a block diagram illustrating a checking circuit for embodying the function indicated by the flow chart of FIG. 12.

FIG. 13 is a block diagram for effecting the above mentioned control based on the program shown in FIG. 12. As stated above, the lifting height counter 222 is provided at the interface 220 shown in FIG. 1. In the embodiment, the lifting height counter 222 comprises three up-down counters 222A, 222B and 222C. The first counter 222A counts pulse output fed from the lifting height sensor 102. The CPU 242 effects a calculation based on the counted value to produce a signal indicative of lifting height. The corresponding lifting height data is displayed on the key board 246. In order to preset the above-mentioned upper and lower limits, there are provided the second counter 222B for presetting the upper limit of the lifting height, for instance, 2.8 m and the third counter 222C for presetting the lower limit, for instance, 8 cm.

A reset switch 222R is switched on under the condition that the fork 18 is placed on ground. Thereby, the first counter 222A is cleared and the upper and lower limits of lifting height are set to the second and third counters 222B and 222C. Then, the lifting height operation of the fork 18 is effected to move the fork 18 in the upward and downward directions. According to this operation, the first counter 222A effects up-count at the time of elevation of the fork 18 to feed up-signal labelled by Su each subtracting input terminal $I_R$ of the second and third counters 222B and 222C. Thus, the reduction is effected in the second and third counters 222B and 222C. Likewise, at the time of lowering of the fork 18, the first counter 222A effects down-count to deliver to each adding input terminal $I_4$ of the down-signal labelled by $S_D$ to the second and third counters 222B and 222C. Thus, addition is effected in the second and third counters 222B and 222C. Accordingly, when the lifting height value of the fork 18 is above the stored upper limit, the output of the second counter 222B is negative to produce a logical output "1". On the contrary, when the lifting height value of the fork 18 is higher than the stored lower limit, the third counter 222C is negative to produce a logical output "1". The output of the third counter 222C is inverted by the NOT gate 224. On the other hand, when the fork 18 reaches the position equal to the stored lower limit or lower than that, the output of the third counter 222C is "0". The output of the third counter 222C is inverted by the NOT gate 224. As a result, the logical signal "1" is fed to the OR gate 226. Thus, when the fork 18 is above the stored upper limit, equal to or below the stored lower limit, either of the input of the OR gate 226 is "1". As a result, the OR gate 226 produces a memory inhibiting signal, even if the operator attempts to set a memory of lifting height to the microcomputer 230 with the key board 246, thereby making it impossible to store a lifting height data.

According to the third embodiment of the present invention, when the position of the fork 18 is above the upper limit previously stored in the microcomputer 230, or below the lower limit stored therein, that is, the fork 18 is not within the range of permitted lifting height, the memory setting of the lifting height data is inhibited. Accordingly, the value stored in the microcomputer 230 by memory-setting of the lifting height data in the unloaded condition is erroneously identified with the value stored in the loaded condition. Even if the automatic lifting height control is effected with a fork lift truck having a fork of which thickness is large, there does not occur the situation wherein the fork 18 cannot be lowered to the lifting height previously set, thereby making it possible to smoothly effect the automatic lifting height control.

Figure 14:
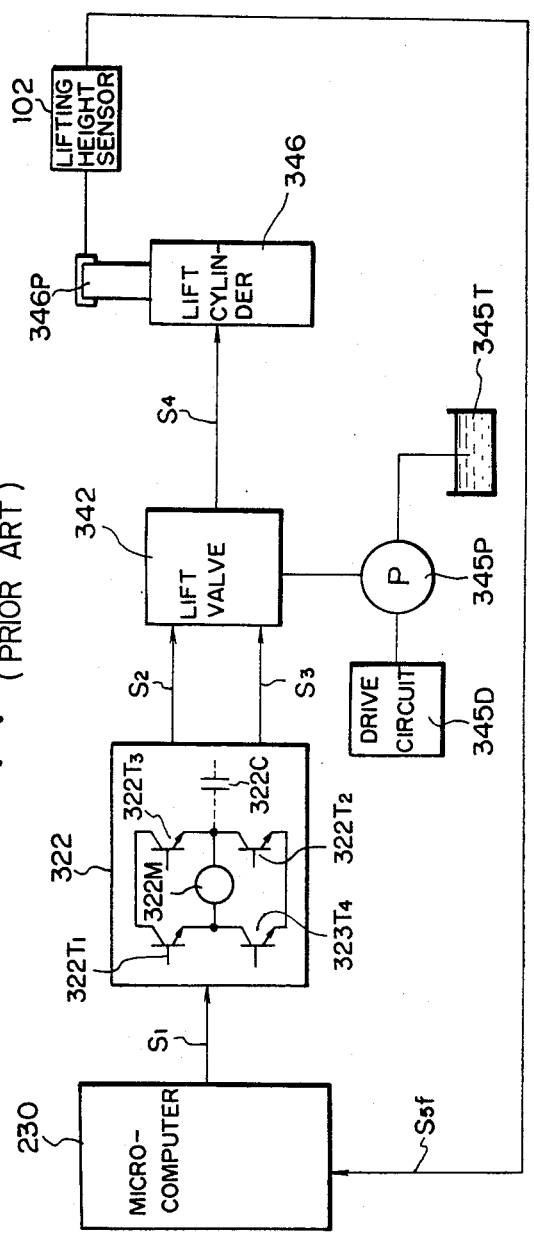
FIG. 14 is a block diagram illustrating a conventional lifting height control device for a loading and unloading mechanism.

Reference is made to the fourth embodiment of the present invention. The second embodiment has solved the problem occuring when a lifting height speed control is effected by controlling a servo driving system for actuating a lift cylinder. For better understanding of the second embodiment, the method of controlling the lifting height speed will be described with reference to FIG. 14. Reference numeral 322 denotes the above-mentioned first actuator which becomes operative in accordance with a command signal $S_1$ indicative of opening angle fed from the microcomputer 230. As stated above, the actuator 322 comprises a driving motor 322M, transistors $322T_1$ to $322T_4$, and clutch 322C. The valve opening angle of the first control valve 342 is controlled by correction signals $S_2$ and $S_3$ fed from the actuator 322. The lift cylinder 346 is controlled by an output signal $S_4$ fed from the first control valve 342. Thereby, the piston 346P becomes operative to effect a lifting height control. Reference numerals 345T and 345P denote hydraulic oil tank and hydraulic pump, respectively. Reference numeral 345D denotes a driving circuit for the hydraulic pump 345P. The driving circuit 345D comprises, for example, an engine or a motor. According to the device thus constructed, (mainly, within the region of medium and low speeds) the follow-up control of the lifting speed (or lowering speed) to the predetermined value is effected by adjusting the opening angle of the first control valve 342 through the driving motor 322M and clutch 322C. The setting speed is stored in the microcomputer 230 with the above-mentioned data setting means 246 e.g. key board. The stored setting speed is compared with the actual speed $S_{5f}$ being fed from the lifting height sensor 102. The command signal $S_1$ indicative of valve opening angle corresponding to the deviation based on the comparison, is fed to the actuator 322 to control the driving motor 322M. The opening angle of the first control valve 342 is corrected by the correction signals $S_2$ and $S_3$ fed from the actuator 322. The lift cylinder 346 is actuated by the control signal $S_4$ to effect a lifting height speed control.

With the above-mentioned arrangement, there exists a response delay. After a correction signal for increasing speed is produced, it takes 10 milliseconds or 100 milliseconds until the driving motor 322M rotates to open the valve with the result that the lifting speed actually increases. Another drawback is pointed out as follows: The valve opening angle command for increasing the speed is continuously fed to the driving motor 322M until the actual lifting speed reaches the setting value newly set for increasing a speed. Particularly, in this instance, in the region where the valve opening angle is small, the change of the speed with respect to the valve opening angle command is abrupt. Accordingly, the speed of the driving motor 322M abruptly increases to increasingly open the first control valve 342, with the result that the lift cylinder 346 is elevated quickly. When the actual lifting height speed reaches the setting value, the deviation is equal to zero. At the same time, when the command for stopping the driving motor 322M is fed to the actuator 322, the driving motor 322M is stopped under the condition that inertia is applied thereto. Accordingly, the valve opening angle at that time is larger than that corresponding to the setting lifting height speed by an amount due to the inertia. As a result, the actual lifting height speed is too fast as compared with the setting lifting speed. Accordingly, the equilibrium between the speed sensed by the lifting height sensor 102 and the setting speed is broken. As a result, a valve opening angle command $S_1$ having a negative polarity is produced by the microcomputer 230 due to the deviation. An inverse operation occurs in the direction of closing the first control valve 342. From the time when the command for stopping the driving motor is produced, the speed of the lift cylinder 346 gradually attenuates varying or vibrating in the positive and negative directions under the condition that the changed lifting height speed serves as a boundary, and then reaches the predetermined lifting height speed after the predetermined time passes.

As stated above, the drawbacks of the prior art lifting height speed control are pointed out as follows: In addition to the response delay, there is a lack of smoothness and stability when effecting a speed control due to the vibration of the lifting height speed when the setting value is altered.

Figure 15:
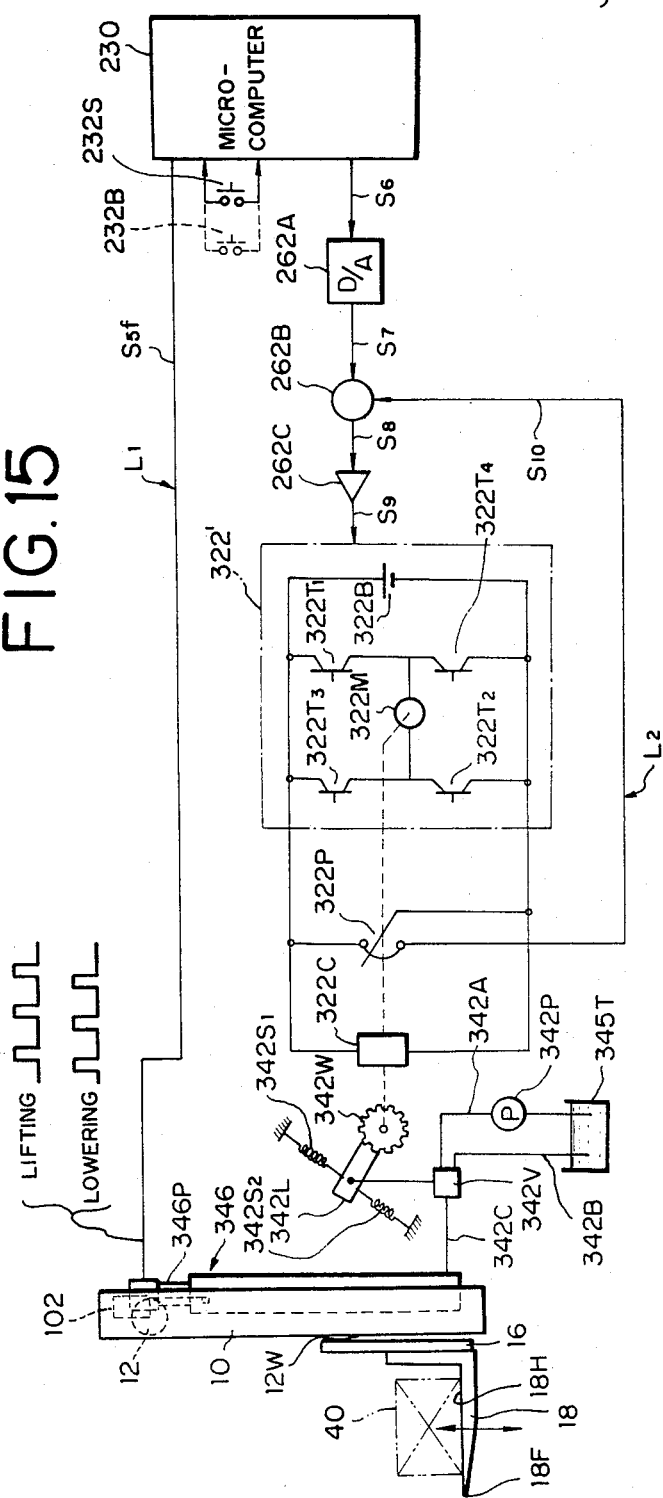
FIG. 15 is a block diagram illustrating a fourth embodiment of a control device for a loading and unloading mechanism according to the present invention.

The fourth embodiment has solved these problems, which will be described with reference to FIG. 15. In FIG. 15, the same reference numerals denote corresponding parts, respectively, for which an explanation is omitted.

In the automatic speed control system, a major loop for lifting height speed control is labelled by $L_1$ and a minor loop for valve opening angle is labelled by $L_2$. Reference numeral 262A denotes a digital to analog converter (D-A converter) for converting a digital command signal $S_6$ fed from the computer 230 to an analog signal $S_7$ indicative of the valve opening angle setting signal. Reference numeral 262B denotes a comparing circuit for comparing the setting signal $S_7$ with a sensed voltage of the servomotor driving circuit referred to soon. Reference numeral 262C denotes an amplifier for amplifying the difference output signal $S_8$ fed from the comparing circuit 262B. The driving motor 322M becomes operative in accordance with the amplifying signal $S_9$ fed from the amplifier 262C. Reference numeral 322P denotes a potentiometer cooperative with the driving motor 322M. The feed back signal $S_{10}$ fed from the potentiometer 322P is fed to the comparing circuit 262B. Reference numeral 342W denotes a toothed wheel which becomes operative in cooperation with the clutch 322C. Reference numeral 342L denotes a lever fixed to the axle of the toothed wheel 342W. The lever 342L is mounted to the one end of each of springs $342S_1$ and $342S_2$. The other ends of these springs $342S_1$ and $342S_2$ are fixed to a stationary member (not shown). A spool (not shown) for opening and closing the valve, which communicates with the duct 342C is disposed within a valve unit 342V. The spool is joined to the lever 342L.

With the above mentioned lifting height control device, the digital command signal $S_6$ fed from the microcomputer 230 is converted into an analog signal by the D/A converter 262A. The analog signal serving as a valve opening setting signal, $S_7$, is fed to the comparing circuit 262B. The servomotor driving circuit 322' becomes operative in accordance with the amplified signal $S_9$ due to the deviation between the valve opening angle setting signal $S_7$ and the feed back signal $S_{10}$. Thus, the predetermined rotational angle of the driving motor 322M is determined. That is, when in accordance with the amplified signal $S_9$ corresponding to the valve opening setting signal $S_6$, the transistors $322T_1$ and $322T_2$ become operative, the driving motor 322M rotates in the forward direction. Conversely, when the transistors $322T_3$ and $322T_4$ becomes operative, the driving motor 322M rotates in the backward direction. According to the rotational angle of the driving motor 322M, the lever 342L is rotated through the clutch 322C and the toothed wheel 342W. Thus, the valve opening angle is determined. As a result, the moving speed of the piston 346P of the lifting cylinder 346 is determined. According to the moving speed of the piston 346P, the pulse signal $S_{5f}$ fed from the lifting height sensor 102 constituted as a pulse generator is fed to the microcomputer 230.

The predetermined setting speed signal is set in the memory 244 of the microcomputer 230. The microcomputer 230 effects a comparing calculation between the actual speed of the piston 346P and the setting speed to output the digital command signal $S_6$. The D/A converter 262A produces a voltage proportional to the command signal $S_6$ to feed it to the comparing circuit 262B. In the comparing circuit 262B, the comparison between the voltage ($S_7$) and the feed back signal $S_{10}$ is effected. The control of the valve opening angle is effected under the condition that the output of the comparing circuit 262B serves as a control command of the minor loop. Thus, the lifting height control is effected in accordance with the above-mentioned operation.

Figure 17:
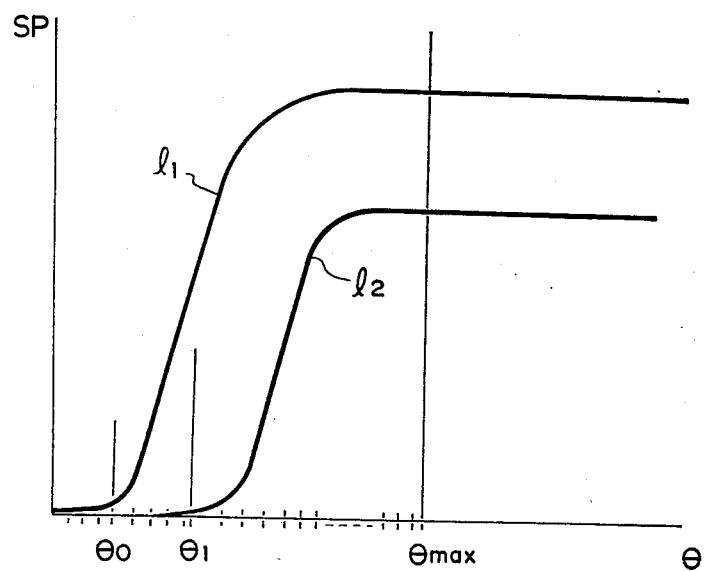
FIG. 17 illustrates a speed characteristic curve of a fork when a lifting height control is effected with the control device shown in FIG. 15.

The speed of the fork 18 is shown as curves $l_1$ and $l_2$ in FIG. 17 where Symbol $l_1$ denotes a characteristic curve in the unloaded condition, and $l_2$ a characteristic curve in the loaded condition. As understood from FIG. 17, the fork 18 is not elevated at the opening angle of $\theta_0$ even in the unloaded condition. At the angle of $\theta_1$, the lifting speed is placed in full speed condition in the unloaded condition, while in the loaded condition, the fork 18 does not move at all. At the angle of $\theta$max. which is maximum opening degree, the lifting speed thereof is placed in full speed condition in the loaded condition. For this reason, in the present embodiment, it is designed so that the angle ranging from $\theta_0$ to $\theta$max. is divided into a plurality of steps, for instance, 50 steps, to output a command signal corresponding to the opening angle of the valve from the microcomputer 230.

Figure 16:
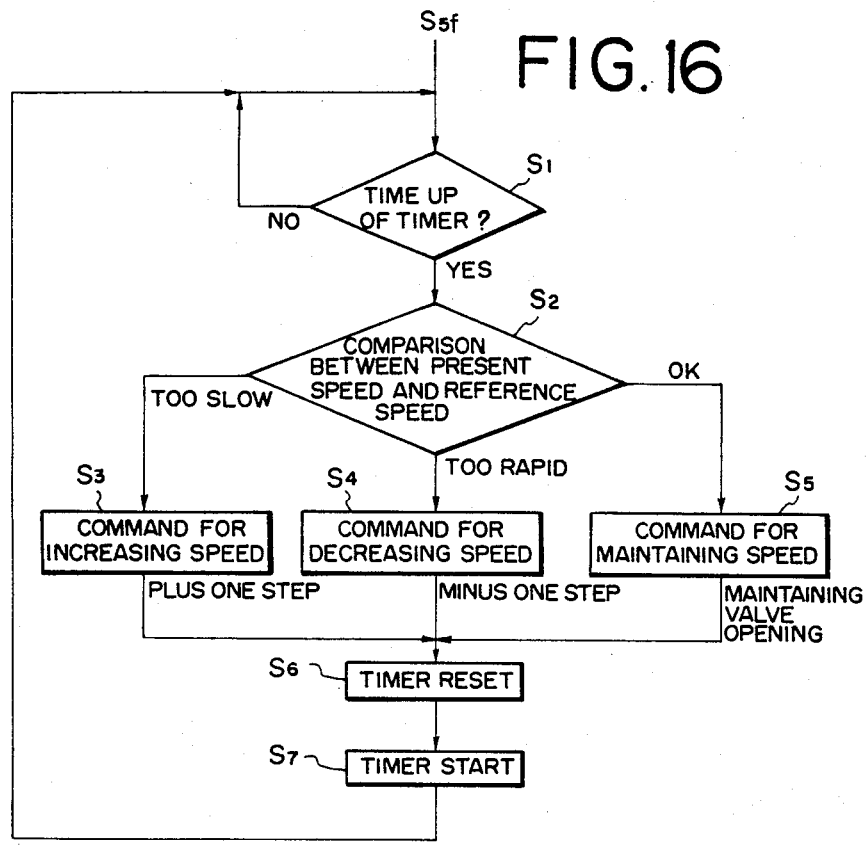
FIG. 16 is a flow chart for effecting a lifting height control with the control device shown in FIG. 15.

FIG. 16 is a flowchart showing an execution of the program of the microcomputer 230.

When the signal $S_{5f}$ indicative of the sensed speed is fed back to the microcomputer 230, at the step $S_1$, it is determined whether the timer setting time is passed or not. If the timer setting time has not passed, the program execution is returned to the step $S_1$ for a second time.

If the predetermined time interval, e.g. 20–30 millisecond set in the timer is passed, the comparison between the present speed and the reference speed is effected at the step $S_2$. If the present speed is not larger than the reference speed, the execution is shifted to the step $S_3$ to deliver a command for increasing the speed by one step. When the present speed is larger than the reference speed, the program execution is shifted to the step $S_4$ to produce a command for decreasing the speed by one step. When the present speed is equal to the reference speed, the command for maintaining the present condition is produced at the step $S_5$. Thus, when the program execution at the step $S_3$, $S_4$ and $S_5$ is completed, the timer resetting operation is effected at the step $S_6$. Thereafter, the timer starting operation is effected at the step $S_7$. The program execution is returned to the step $S_1$. The same procedure will be repeated.

The program execution for comparing the setting value and the present speed in the microcomputer 230 is stated above. Turning now to FIG. 15, the operation of the lifting height speed control device according to the present embodiment is described, assuming that the correction of the lifting height speed is effected under the condition that the fork 18 is controlled at the predetermined lifting height speed.

Figure 18:
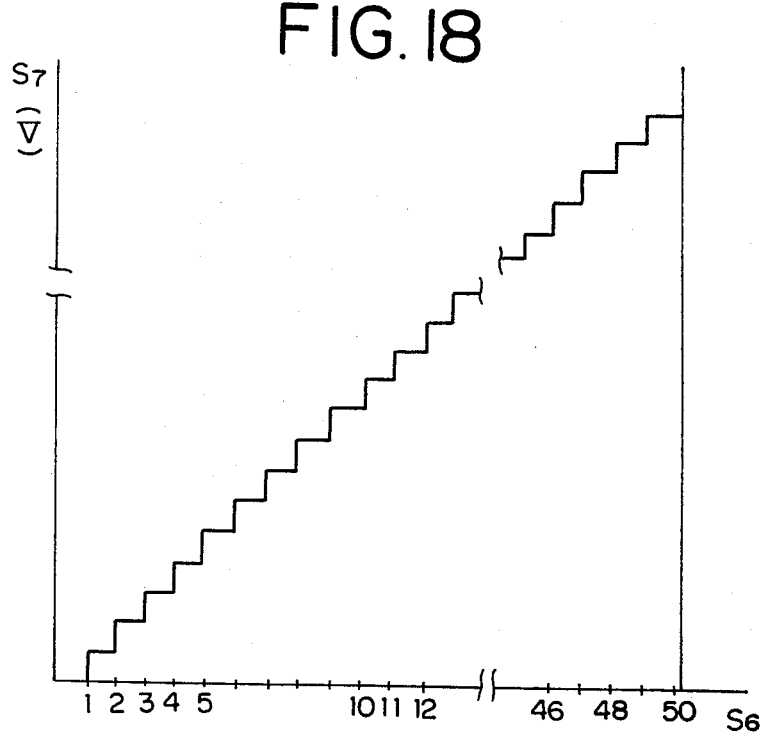
FIG. 18 is a graph illustrating a valve opening angle setting signal with respect to a command signal fed from a microcomputer employed in the control device shown in FIG. 15.

When the speed sensing signal $S_{5f}$ corresponding to the moving speed of the piston 346P obtained by the lifting height sensor 102 is fed to the microcomputer 230, the judgement as to whether the predetermined time set by the timer passes or not is effected in accordance with the flowchart shown in FIG. 16. Thereafter, the comparison between the setting speed and the present speed is effected. If the present speed is less than the setting speed, as shown in FIG. 16 the microcomputer 230 produces the binary coded command signal $S_6$ for increasing the speed by plus one step. If the present speed is above the setting signal, the microcomputer 230 produces the coded command signal $S_6$ for decreasing the speed by minus one step. If the present speed is equal to the setting signal, the microcomputer 230 produces the coded command signal $S_6$ for maintaining the speed. In the D/A converter 262A, the command signal $S_6$, which is a coded signal, as for example, 0 to 50 in FIG. 18 is analog-converted to produce a voltage signal corresponding thereto. This voltage signal serves as a valve opening angle setting signal $S_7$. As stated above, the valve opening setting signal $S_7$ is rendered to the minor loop L$_2$ as the control command. Thus, the first control valve 342 is controlled. According to this control, the lifting height speed is controlled.

According to the second embodiment of the invention, the subsequent correction signal is not increased or decreased solely by one step due to the difference between the actual speed and the setting speed, in a time delay of about 10 milliseconds set by the timer after the preceeding correction signal is produced. Accordingly, after the correction signal is produced and after there then occurs a change of the speed due to the correction, the subsequent correction is effected. As a result, an excessive correction can be eliminated. Further, since the adjusting step of the valve opening angle is sufficiently small, the rotational angle of the driving motor 324M is small with respect to each correcting operation. As a result, in the stopping operation of the driving motor 322M, effected due to a stopping command which is produced when the speed reaches the setting value, there is little possibility of producing an excessive rotation of the driving motor 322M due to inertia. Further, the changing step of the valve opening angle is sufficiently small, thereby making it possible to prevent the speed from being abruptly changed. Accordingly this brings about a stabilized lifting height control.

Reference is made to the fifth embodiment of the invention. In this embodiment, the lifting height speed control device shown in FIG. 15 is employed. The same reference numerals used in FIG. 1 denote corresponding parts, which explanation will be omitted.

A program for an automatic lifting height control is stored in the microcomputer 230. When a push button for starting lifting height operation is pushed, the microcomputer 230 feeds a control signal to the first control circuit 262 (see FIG. 1) in accordance with the program for lifting height control. The control circuit 262 feeds a control command indicative of valve opening angle to the base of each of transistors 322T$_1$ to 322T$_4$ constituting a servomotor driving circuit 322 to effect an ON-OFF control of these transistors. Thus, the driving motor 322M is controlled, so that the first control valve 342 is actuated similarly to the above-mentioned embodiment.

As a result, the lift cylinder 346 lifts or lowers the fork in accordance with the upward and downward movement of the piston 346P of the lift cylinder 346.

The microcomputer 230 senses the lifting height and the speed of the fork 18 due to the pulse output fed from the lifting height sensor 102. On the basis of these sensed data, the microcomputer 230 executes a program for effecting an automatic lifting height control.

However, in such an automatic lifting height control device to which microcomputer 230 is applied, if the fork 18 is attempted to be suddenly stopped in the condition of the high speed when the height of the fork 18 is varied from one height to the other height and then is stopped thereat, it is likely that the load 40 mounted on the fork 18 will become misshapen. Therefore, it is desirable to slowly decelerate the fork 18. When the height of the fork 18 is changed, there occurs a situation in which it is necessary to lower the speed at the time of attitude of the load 40 which is easily misshapen. In such a case, it is necessary to effect a follow-up control of the speed. There is a time delay until the lifting speed follows up to the setting value by the speed control command fed to the first control circuit 262 from the microcomputer 230. Further, the actual speed is calculated by the frequency of the pulse output, which is provided by the lifting height sensor 102, occuring every time the fork 18 moves for a predetermined interval. However, it takes much time to sense the lifting height speed. For this reason, there is an inconvenience in an automatic speed control immediately before the objective height.

Figure 19:
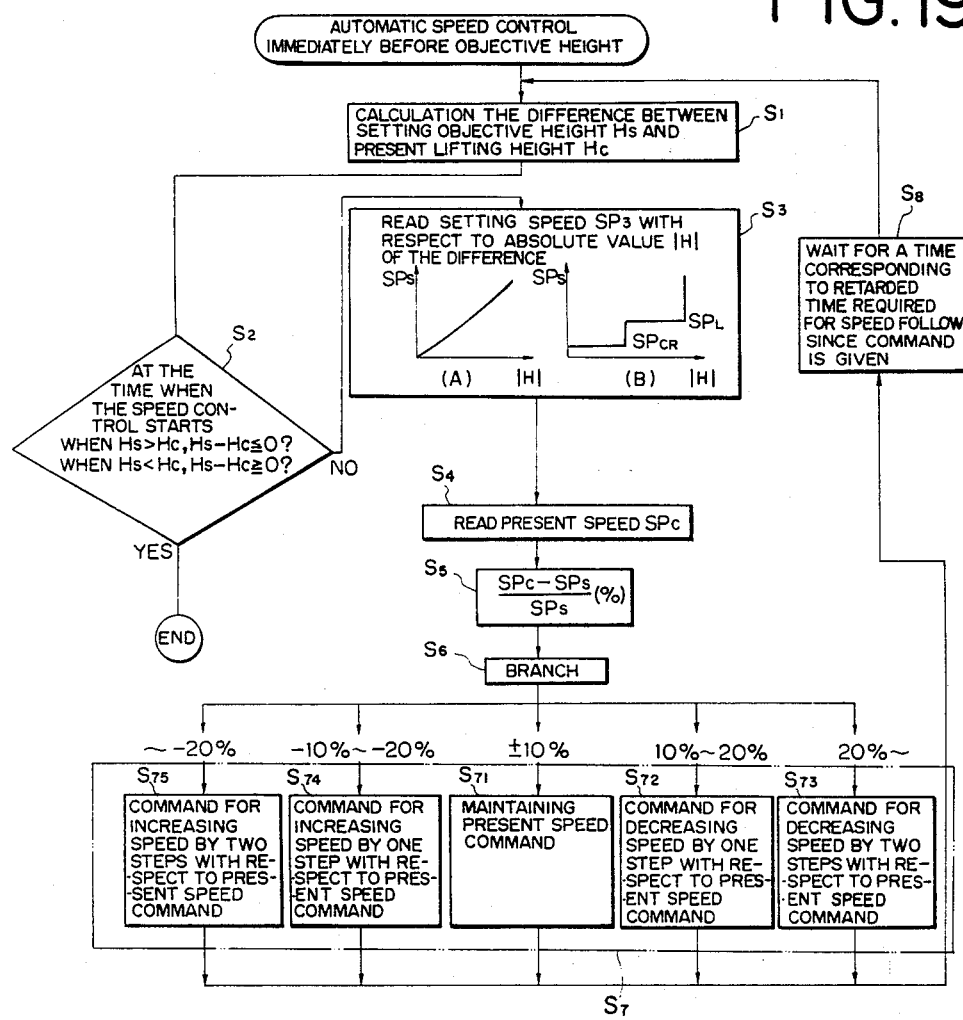
FIG. 19 is a flow chart showing an automatic speed control immediately before the objective height effected by a fifth embodiment of the control device for a loading and unloading mechanism according to the present invention.

The fifth embodiment of the invention has solved these problems, which will be described with reference to the flow chart of FIG. 19 illustrating an embodiment of an automatic speed control immediately before objective height. At the step S$_1$, the difference between the setting objective height Hs and the present height Hc is calculated. At the step S$_2$, it is judged whether the lifting height reaches the setting objective height Hs. As a result, if the present lifting height reaches the setting objective height Hs, the automatic speed control is completed. On the contrary, if the present lifting height does not reach the setting objective height Hs, the program execution is shifted to the step S$_3$. The data pattern relating the setting speed SPs with the absolute value |H| of the difference between the setting objective height Hs and the present height Hc is stored in the microcomputer 230. An example of the data pattern is shown by (A) and (B). At the step S$_3$, a reading operation of the setting speed SPs with respect to the absolute value |H| is effected. Then, at the step S$_4$, the read operation of the present speed SPc is effected. The present lifting height is calculated by counting the pulses generated every time the fork moves a predetermined distance, generated by the lifting height sensor 102. On the other hand, the present speed is calculated by measuring an interval of pulse duration. The measured time is as shown in FIG. 20A from the rising of the pulse train (or the falling thereof) to the subsequent rising of the pulse train (or the falling thereof). The timer pulse train as shown in FIG. 20B is obtained by a software timer.

The procedure for obtaining the timer pulse train will be described with reference to FIG. 20C. First of all, at the step S$_1$, the judgement as to whether the status of the sensor pulse train is "1" is effected. At the step S$_2$, the waiting operation, for a predetermined time interval, e.g. 1 m sec is effected. At the step S$_3$, the timer count value is advanced by one. At the step S$_4$, the judgement as to whether the status of the pulse train is "1" at that time is effected for a second time. Until the status of the pulse train is "1", the program shown by steps S$_2$ and S$_3$ continues to be executed. When the status of the pulse train is "1", as shown in step S$_5$, the value of the timer count is calculated. Thus, measuring time information is obtained.

The processing at the step S$_4$ shown in FIG. 19 is stated above. The remaining processing for a program executed in accordance with the flow chart will be described as follows:

At the step S$_5$, (SPc−SPs)/SPs (%) is calculated. The program execution is branched as shown in step S$_7$ proportional to the difference due to the branching command as shown in the step S$_6$. When the difference is small (for instance, within 10%), the maintaining present speed command is produced as shown in the step S$_{71}$. When the difference is from +10% to +20%, the command (for decreasing the valve opening angle by one step with respect to the present valve opening angle) for decreasing the speed by one step is produced as showin in the step S$_{72}$. One step is defined as one interval obtained by equally dividing the predetermined region of lift valve opening angle into multiple steps, as shown in FIG. 18. When the difference is above 20%, the command for decreasing speed by two steps with respect to the present speed command is produced as shown in the step S$_{73}$. When the difference is from −10% to −20% or above −20%, the command for increasing the speed by one step or the command for increasing the speed by two steps is produced as shown in steps S$_{74}$ and S$_{75}$, respectively. The program shown by the flow chart shown in FIG. 19 is executed by the microcomputer 230. The speed command signals corresponding to the steps S$_{71}$ to S$_{75}$ are fed to the first control circuit 262 shown in FIG. 15 by the microcomputer 230. After a constant retarded time as shown in the step S$_8$, the program execution shown in FIG. 19 is repeated. When the constant speed control is effected, SPs shown in FIG. 19 is a constant value. The speed control command as shown in FIG. 15 is produced according to the magnitude of the actual speed SPc.

Figure 20C:
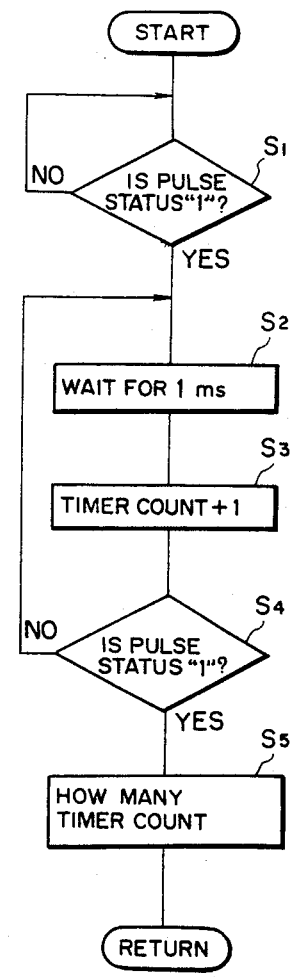
FIG. 20C is a flow chart for producing the timer pulse train shown in FIG. 20B.

As stated above, when the flow chart shown in FIG. 19 is executed, the present speed is obtained by a software timer as shown in FIGS. 20A, 20B and 20C instead of frequency of the sensor output. Accordingly, it is possible to promptly sense the present speed. For this reason, the follow-up control in the automatic speed control system immediately before the objective height is effected promptly because of the fact that the sensing of the lifting height speed is quicked.

Reference is made to the sixth embodiment of the invention.

In the above mentioned fork lift truck, as shown in FIG. 2, during automatic lifting height control, when the fork 18 does not reach the objective height (object position), there occurs a situation in which the control is interrupted and stopped by the judgment of an operator. In the prior art, such a stopping actuation is effected with the operation of an emergency stop button or a manual lever.

However, when the actuation is effected with the emergency stop button or the manual lever, the shift operation of a spool provided in the first control valve 342 to the neutral position is abruptly effected. For this reason, lifting or lowering speed suddenly becomes zero or suddenly varies. As a result, there occurs an undesirable feeling. Alternately, the load may drop, resulting in a serious accident.

The present embodiment has solved these problems, which is explained with reference to accompanying drawings. In the present embodiment, the automatic lifting height control device used in the third embodiment is employed. FIG. 21 is a flow chart showing a main program for an automatic lifting height control.

At the step S$_1$, the absolute value |H| of the difference between the objective height (Hs) at which the top portion of the fork 18 arrives and the present height (Hc) is detected. At the step S$_2$, the judgement is made as to whether the absolute value |H| is equal to zero or not. If the absolute value |H| is equal to zero, it is judged that the fork 18 has reached the objective height. Accordingly, as shown in the step S$_3$, the command for stopping the driving motor is produced. When the absolute value |H| is not equal to zero, at the step S$_4$, a judgement is effected as to whether the absolute value is equal to or less than 50 cm. If |H|>50 cm, at the step S$_5$, the command for maintaining the present speed is produced. At the step S$_4$, if the absolute value |H| is equal to or less than 50 cm, the program execution is shifted to the step S$_6$. At the step S$_6$, the judgement as to whether the absolute value |H| is equal to or less than 20 cm is effected. If 50 cm>|H|>20 cm, at the step S$_7$, the medium speed control command output is fed to the first control circuit 262. If |H|≦20 cm, at the step S$_8$ low speed, as for example, very slow control command output is fed to the first control circuit 262. Thus, the first control circuit 262 delivers the servo valve opening angle command signal corresponding to each input signal to the transistors 322T$_1$ to 322T$_4$ constituting the servomotor driving circuit 322' to control the driving motor 322M. Thus, as understood from the description stated above, the first control valve 342 and the lift cylinder 346 are controlled in accordance with the output of the servomotor driving circuit 322'. During such an automatic lifting height control, when the fork 18 does not reach the objective height, there occurs a situation in which it is required to interrupt and stop the movement of the fork 18 according to the operator's will. In such a case, it is desirable to slowly stop the fork 18.

The operation for slowly stopping the fork will be effected as follows: (control mode)

(1) a judgement as to whether the control is effected at the high speed, medium speed, or low or very slow speed is effected.

(2) If the control is effected at the high speed, the command for the high speed is changed to the command for the medium speed.

(3) If the control is effected at the medium speed, the command for the medium speed is changed to the command for the very slow speed.

(4) If the control is effected at the very slow speed, the command for stopping the movement is produced or the command for continuing to effect the automatic control is produced.

(When the very slow control is effected immediately before the objective height during an automatic control is effected, the automatic control is continued.)

(5) When the control is entered into the control for slowly stopping the driving motor, (a) the driving motor is decelerated and stopped in a predetermined retarded time on the basis of the following pattern; high speed→medium speed→very slow speed→stop (the method of changing the mode according to time).

(b) The control is effected depending on driving condition. For instance, when the control is effected at the high speed, the objective distance (objective position) Hs is altered to the distance obtained by adding 50 cm to the present position and the command is changed so that the medium speed control is effected. If the the fork is within 20 cm with respect to the setting objective position, the command is changed so that the very slow control is effected and stopped at the objective position.

On the other hand, if the control is effected at the medium speed, the setting is effected so that the objective position Hs is 20 cm. Thus, the command is changed so that very slow speed is effected and stopped at the object position. (The method of changing the control mode according to the distance).

Figure 22:
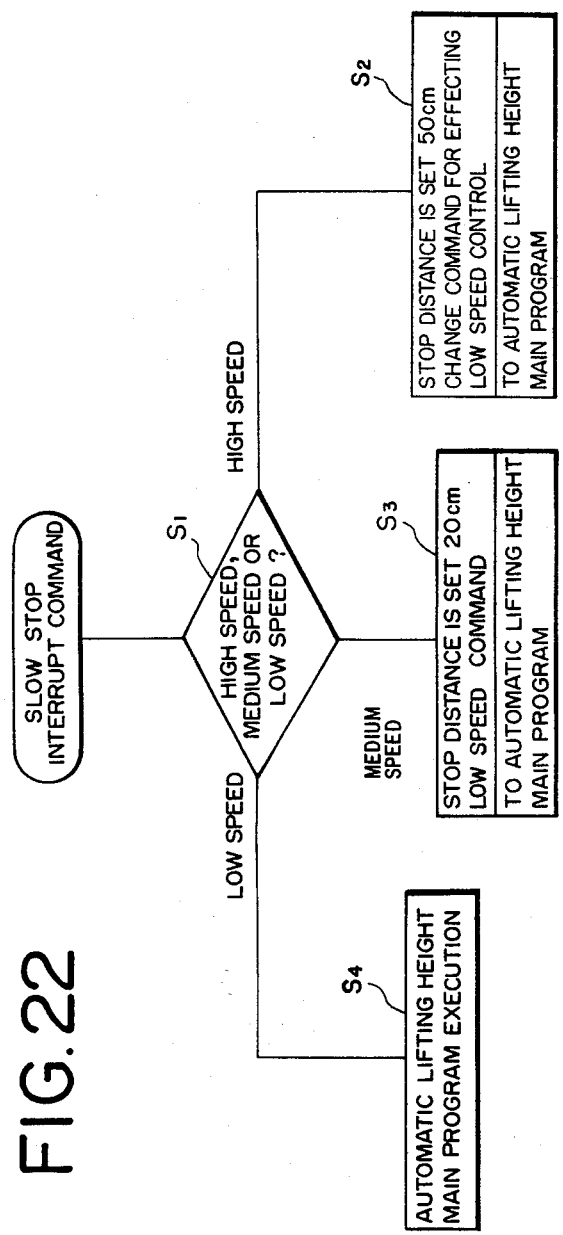
FIG. 22 is a flow chart illustrating a subroutine for slow stop interrupting command employed in the sixth embodiment according to the invention.

Reference is made to the methods as defined in the items (1) to (4) and 5(b) with reference to FIG. 22.

Figures 23A, 23B:
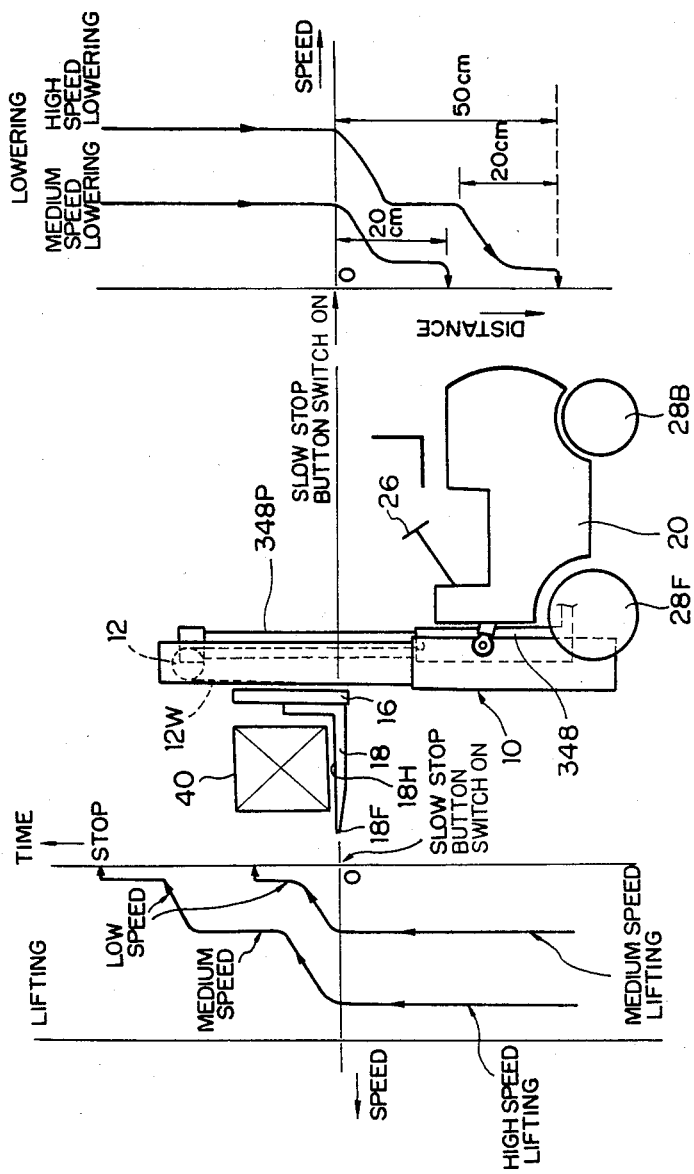
FIGS. 23A and 23B are views for explaining a lifting height operation effected with the control device of the sixth embodiment according to the invention.

A subroutine for slow stop interrupt command, that is, the method defined in items (1) to (4) and 5(b) shown in FIG. 22 is set to the main program stored in the microcomputer 230, which is shown in FIG. 21. The microcomputer 230 is provided with a push-button switch 232B for slow stop interrupt command. When the push-button switch 232B is pushed, the slow stop interrupt command shown in FIG. 22 is produced. The microcomputer 230 judges as to whether the present speed is high, medium or low (very slow) at the step $S_1$ on the basis of the output of the lifting height sensor 102. If the speed is high, the program execution is branched to the step $S_2$. At the step $S_2$, 50 cm is entered into the objective height (Hs) and the program execution is shifted to the main program for automatic lifting height. If the speed is medium, the program execution is branched to the step $S_3$. At the step $S_3$, 20 cm is entered into the objective height Hs and the program execution is shifted to the main program shown in FIG. 21. If the speed is very slow, the program execution is branched to the step $S_4$. As shown in the step $S_4$, the main program for automatic lifting height shown in FIG. 21 is continued under the condition that the objective height Hs is the same as that of the previous one. Thus, the microcomputer 230 executes the main program for automatic lifting height shown in FIG. 21 on the basis of the slow stop interrupt command shown in FIG. 22. The corresponding control command signal is fed to the first control circuit 262 from the microcomputer 230. Assuming that the fork 18 is lowering, the top portion 18F of the fork 18 is completely stopped as shown in FIG. 23A. Assuming that the fork 18 is lifting, the fork 18 is stopped as shown in FIG. 23B.

During automatic lifting height control, when the push button switch 232B for slow stop interrupt command provided in the microcomputer 230 is switched on, the microcomputer 230 determines the distance required for the stop of the fork 18 due to the speed immediately before that time. The decelerating operation is effected by gradually lowering the setting speed until the fork 18 reaches the object height. Thus, the fork 18 is completely stopped. That is, the speed control is softly effected until the fork 18 is placed in the stopped mode. Accordingly, this makes it possible to eliminate a shock which may be caused when the fork 18 is stopped. As a result, dropping of the load 40 does not occur.

According to the present embodiment, the slow stopping operation is effected with the method defined in the items (1) to (4) and 5(b). However, the present invention is not limited to this procedure. This slow stopping operation can be performed with the method defined in the items (1) to (4) and 5(a). In this instance, instead of setting and judging due to the distance (steps $S_1$ to $S_4$ and step $S_6$ shown in FIG. 21, the steps $S_2$ and $S_3$ shown in FIG. 22), it is sufficient to use the setting and judging due to time. For instance, the lifting operation of the fork 18 is exemplified. The following procedure is applicable to the lowering of the fork 18. As shown in FIGS. 23A and 23B, due to the actuation of the push-button switch 232B, the microcomputer 230 produces a command for decreasing the speed immediately before that time by one step. The microcomputer produces a command for further decreasing the step by one step in a predetermined time. Thus, the fork 18 is completely stopped. Since the control for stopping the fork is softly effected, the shock occuring when the fork is stopped can be eliminated. As a result, the load 40 will not fall down.

As is clear from the foregoing description, the control device according to the present embodiment has the following advantages:

During an automatic lifting height control, when slowly stopping operation is required, the push-button switch 232B for slow stop interrupt command is pushed.

Thereby, the control for stopping operation is effected by making good use of the method of decreasing the lifting speed immediately before the push button switch 232B is switched on as a function of time (method as shown in the item 5(a)) or the method for decreasing the same as a function of distance (method as shown in the item 5(b)) set in the microcomputer 230. The suitable setting of the time and distance at the time of utilizing the above-mentioned methods makes it possible to prevent dropping of the load, thereby enabling smooth stopping.

In FIGS. 22 and 21 embodiments in which the method featured by the item 5(b) is employed, 50cm and 20 cm are used as the setting distance. However, the distance is not limited to this value. According to the situation of a load 40 placed on the horizontal portion 18H of the fork 18, the above selected distance of 50 cm and 20 cm can be suitably changed. On the basis of the modified value, the microcomputer 230 freely adjusts the decelerating speed.

Reference is made to the fifth embodiment of the present invention. The present embodiment aims at stabilization of the lifting height speed control. An automatic lifting height control is effected with the computer controlled device shown in FIG. 15.

In such an automatic lifting height control, if the actual lifting height speed is too quick as compared with the speed required for suitable lifting height speed control, a control signal in the direction of closing the first control valve 342 is fed to the first control circuit 262 from the microcomputer 230. As a result, if the actual lifting height speed sensed by the lifting height sensor 102 is still quick, the microcomputer 230 delivers a control signal in the direction of closing the first control valve 342. However, since the change of the speed with respect to the valve opening angle is very abrupt as shown in a characteristic curve of FIG. 24, if, for instance, the command of the valve opening angle $\theta_2$ is produced, the fork 18 is stopped. If the fork 18 is stopped, the lifting speed is too slow, the microcomputer 230 produces an accelerating command (in the direction of opening the valve). However, if the lifting speed becomes too quick in a short time, the same operation will be caused, with the result that the change of the speed cannot be smoothly effected and it is difficult to stabilize the lifting speed.

The feature of the present embodiment resides in that, when effecting a predetermined lifting height speed control, the upper and lower limits are set to the servo valve opening command so that the valve opening angle command is within the predetermined range, and so that a control signal for the servo valve opening angle command, which feeds the servomotor driving circuit 322' for controlling the first control valve 342, is provided to the first control circuit 262 in such a manner that the valve opening angle command is limited to the predetermined region, is rendered to the microcomputer 230.

Figure 24:
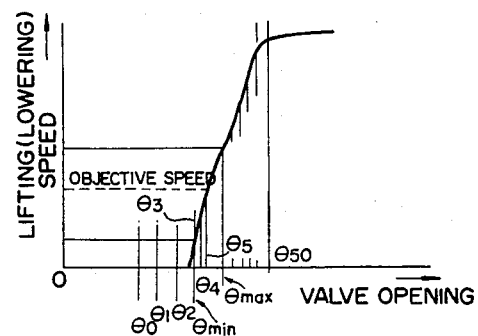
FIGS. 24 and 25 are graphs each illustrating the relationship between lifting speed and valve opening angle in the sixth embodiment of the present invention.

In the automatic lifting height control according to this embodiment, for instance, when effecting a low or very slow control, the device is designed so that a speed command can be produced solely between $\theta_{min.}$ and $\theta_{max.}$ in terms of the valve opening angle command, as shown in FIG. 24. In FIG. 24, the valve opening angle is equally divided into multiple steps as indicated by $\theta_0$ to $\theta_{50}$. (For instance, the valve opening angle may thus be divided into 50 steps).

Figure 25:
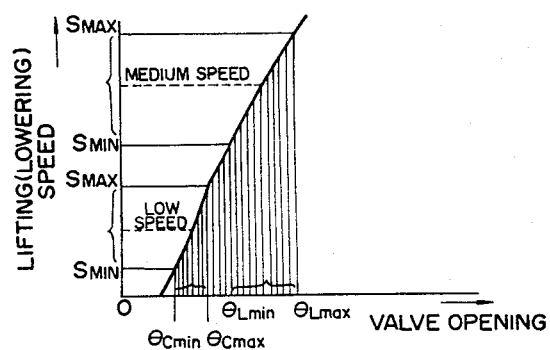

The present embodiment of automatic lifting height control of the present invention will be described with reference to a flow chart for a lifting height speed control routine shown in FIG. 26 and a characteristic curve illustrating a valve opening angle (lift valve opening angle) versus lifting height speed shown in FIG. 25. In FIG. 25, the valve opening angle is divided into multiple steps, thereby making it easy to adjust the speed by increasing or decreasing by each one pitch. In FIG. 25, the control region of medium speed overlaps that of slow speed. The microcomputer 230 executes a lifting height speed control routine in FIG. 26. The microcomputer 230 judges whether the speed is medium or very slow at the step $S_1$. If the control is placed in the medium speed control condition, the upper limit $\theta_{Lmin.}$ and the lower limit $\theta_{Lmax.}$ of the valve opening angle (lift valve opening valve) is substituted for the upper limit $S_{max.}$ and the lower limit $S_{min.}$ of the lifting height speed as shown at the step $S_2$. Thus, the operational speed control region is set. In connection with the very slow control, the same setting is effected at the step $S_3$. The comparison between the setting speed and the actual speed (the speed sensed by the lifting height sensor 102) is effected at the step $S_4$. At the step $S_5$, it is determined whether an increasing or decreasing of the speed is required. When it is necessary to increase the speed, the valve opening angle is increased by one step. At the step $S_6$, the judgement is made whether the speed is above the upper limit $S_{max.}$ if one step is added to the present opening angle. If the resulting speed is above the upper limit $S_{max.}$, one step is not added to the present opening angle to maintain the present opening angle of the valve (see step $S_9$). If the speed is not above the upper limit $S_{max.}$, the speed control signal added to the present opening angle by one step is produced (see step $S_8$). When the deceleration of the speed is required at the step $S_5$, the valve opening angle is reduced by one step. At step $S_7$, the judgment is made as to whether the speed set to be reduced by one step with respect to the present opening angle is below the lower limit $S_{min.}$. If the resulting speed is below the speed limit $S_{min.}$, the speed control signal of the present angle of the valve is maintained (see step $S_9$). If the speed is above the speed lower limit $S_{min.}$, the speed control signal is reduced by one step with respect to the present opening angle (see step $S_{10}$). At the step $S_5$, if the setting speed is equal to the actual speed, the present opening angle command output of the valve is maintained.

Figure 26:
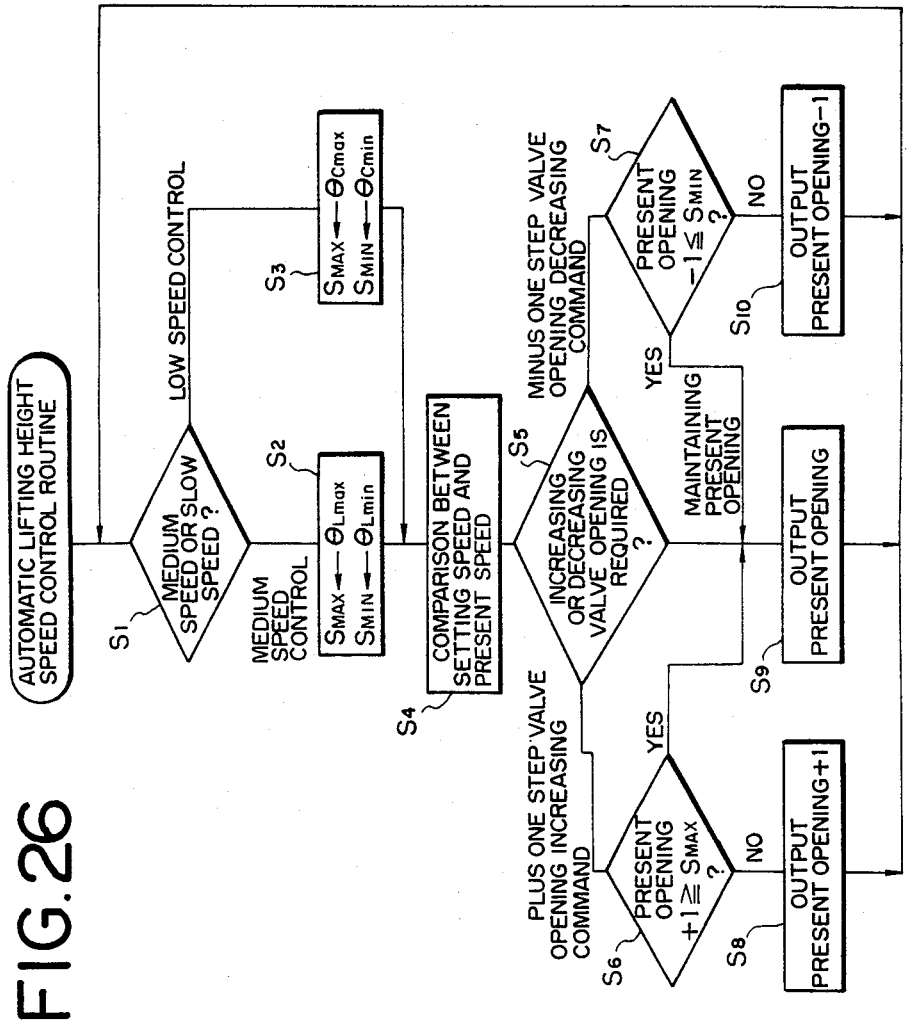
FIG. 26 is a flow chart illustrating an automatic lifting height speed control routine employed in the seventh embodiment of the present invention.

Thus, the speed control command signal corresponding to any of the steps $S_8$, $S_9$, and $S_{10}$ in the flow chart of FIG. 26 is delivered to the first control circuit 230 from the microcomputer 230 to effect a speed control due to the automatic lifting height control.

The program for speed control is stored in the microcomputer 230 as follows: When effecting medium speed control, the upper and lower limit $\theta_{Lmax.}$ and $\theta_{Lmin.}$ of the valve opening angle (the opening angle of the lift valve 342) corresponding to the upper and lower limits $S_{max.}$ and $S_{min.}$ of the speed are previously set. The microcomputer 230 delivers a speed control command signal to the first control circuit 262 in accordance with the flow chart shown in FIG. 26 so that the valve opening angle lies within the above mentioned valve opening angle region. In connection with the slow speed control, the same control is effected.

As is clear from the foregoing, since the prior art fork lift valve control device does not set the opening region of the lift valve in the adjustment of the speed, the speed is too quick or slow with the speed being beyond the predetermined region. As a result, it is difficult to adjust the speed with the result that the speed becomes unstable. On the contrary, according to the present embodiment, the lift valve adjusting region is limited to the predetermined region. Accordingly, the variable region of the actual lifting height speed is narrowed in accordance with the limitation of the lift valve adjusting region. As a result, the last mentioned embodiment makes it possible to stabilize the lifting speed.

Although several preferred embodiments of the present invention have been illustrated and described, it is believed evident to those skilled in the art that many changes and variations may be made without departing from the spirit and scope of the present invention. Accordingly, the present invention is to be considered as limited by the following claims.

What is claimed is:

1. In a control device for a loading and unloading mechanism adapted to a fork lift truck comprising:
   (a) a sensor unit (100) including at least a lifting height sensor means (102) for measuring a lifting height of a fork movably mounted on the fork lift truck, and a load sensor means (106) for detecting the weight of a load supported by the fork,
   (b) a control unit (200) comprising an interface circuit including a lifting height counter means (222) for counting output signals from the sensor unit, and first data setting means manually operable by an operator,
   (c) a control command producing circuit (240) provided in the control unit (200), said control command producing circuit (240) including a memory means (244) for storing data indicative of lifting height, and second data setting means (246) manually operable by an operator for setting data indicative of lifting height into the memory means, said control command producing circuit producing a command signal indicative of valve opening on the basis of a comparison between outputs of the sensor unit (100) and the data stored in the memory means,
   (d) a servomotor driving circuit means (320) responsive to the command signal indicative of valve opening produced by the control unit to produce a drive control signal, and
   (e) a hydraulic pressure driving circuit means (340) responsive to the driving control signal for producing a control signal for hydraulically controlling a lift cylinder (346),
   the improvement wherein
   said control command producing circuit comprises storage control means for storing in said memory means data indicative of a predetermined allowable lifting height control range input to the memory means by said second data setting means prior to a loading and unloading operation, and
   said storage control means further operable for storing in a first memory area a first lifting height data indicative of a preselected lower value ($H_l$), required for a loading and unloading operation and a second lifting height data indicative of a preselected higher value ($H_h$) required for the same operation in a memory location corresponding to a common address designated by said second data setting means,
   wherein said storage control means is further operable for storing in a second memory area storage indication data for confirming storage in said first memory area of data indicative of a lifting height, said second memory area allotted to a predetermined bit or bits of a memory area outside of the first memory area in which the lifting height data are stored.

2. A control device for a loading and unloading mechanism as defined in claim 1, wherein said storage control means is operable for storing said storage indication data confirming storage of said lifting height data in a memory location in said second memory area having an address related to the address of a memory location in the first memory area in which the corresponding lifting height data are stored.

3. A control device for a loading and unloading mechanism as defined in claim 1 wherein said data indicative of a predetermined allowable lifting height control range are stored in the memory means by said second data setting means prior to the loading and unloading operation, and said control command producing circuit 240 comprises means for inhibiting storage of lifting height data in the memory means 244 when the actual lifting height data sensed by the lifting height sensor means 102 exceeds a preselected upper limit, or is equal to or less than a preselected lower limit.

4. A control device for a loading and unloading mechanism as defined in claim 3, wherein said means for inhibiting comprises a first up-down counter 222A responsive to the output of the lifting height sensor means 102, a second up-down counter 222B for presetting said upper limit, responsive to an output signal of said first up-down counter 222A, and a third up-down counter 222C for presetting said lower limit, responsive to said first up-down counter 222A, whereby storage of the lifting height data in the memory 224 is inhibited by the counter of either of said second and third up-down counters 222B, 222C.

5. A control device for a loading and unloading mechanism as defined in claim 1 wherein the control unit 200 further comprises a control circuit means 260 responsive to a difference between the command signal from said control command producing circuit 240 and a feedback signal of the servomotor driving circuit 320 for controlling the servomotor driving circuit means 320.

6. A control device for a loading and unloading mechanism as defined in claim 5 wherein said control command producing circuit 240 provides for said command signal a plurality of discrete levels on the basis of a signal derived from said lifting height sensor means 102 representing lifting speed.

7. A control device for a loading and unloading mechanism as defined in claim 6, wherein said control command producing circuit 240 compares the lifting height data previously set into said memory means with the actual lifting height indicated by an output of a lifting height counter means 222 connected for counting the output of said lifting height sensor means 102 in a predetermined time interval after receipt of said output, and thereafter provides said plurality of discrete levels for said command signal.

8. A control device for a loading and unloading mechanism as defined in claim 5 wherein a data table representing a relationship between preset lifting speed data and the absolute value of a difference between a desired lifting height and a present lifting height is stored in said memory means, and wherein said control command producing circuit 240 is operable for producing a command signal in accordance with the difference between the preset lifting height data read from said data pattern and the present lifting height.

9. A control device for a loading and unloading mechanism as defined in claim 8 wherein said control command producing circuit further comprises timer means for measuring time intervals between pulses of a pulse output signal from said lifting height sensor means 102, thereby obtaining lifting speed.

10. A control device for a loading and unloading mechanism as defined in claim 5 wherein there is provided a push-button switch 232B activated for slowly stopping the hydraulic pressure driving circuit means, said control command producing circuit 240 producing a decelerating stepping command related to the speed of the fork immediately before the push-button switch 232B is actuated on the basis of one of a predetermined time and a predetermined distance.

11. A control device for a loading and unloading mechanism as defined in claim 7 wherein said control command producing circuit 240 produces a signal for limiting a valve opening angle of a control valve of said hydraulic pressure driving circuit means to a predetermined region.

12. A control device for a loading and unloading mechanism as defined in claim 1 wherein said storage control means is further operable for particularly storing said first and second lift height data at a memory location having a common address related to an individual shelf associated with said data.

* * * * *